(12) United States Patent
Boué et al.

(10) Patent No.: US 12,596,873 B2
(45) Date of Patent: Apr. 7, 2026

(54) OPTIMIZATION OF RETRIEVAL AUGMENTED GENERATION USING DATA-DRIVEN TEMPLATES

(71) Applicant: Microsoft Technology Licensing, LLC, Redmond, WA (US)

(72) Inventors: Laurent Boué, Petah Tikva (IL); Kiran Rama, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 168 days.

(21) Appl. No.: 18/627,842

(22) Filed: Apr. 5, 2024

(65) Prior Publication Data

US 2025/0315617 A1      Oct. 9, 2025

(51) Int. Cl.
*G06F 40/279*          (2020.01)
(52) U.S. Cl.
CPC .................................. *G06F 40/279* (2020.01)
(58) Field of Classification Search
CPC ............. G06F 40/279; G06F 16/33295; G06F 16/3329
See application file for complete search history.

(56) References Cited

U.S. PATENT DOCUMENTS

2025/0094703 A1* 3/2025 Malak ...................... G06F 40/20
2025/0284888 A1* 9/2025 Khullar ................. G06F 40/205
2025/0292014 A1* 9/2025 Sarferaz .................. G06F 40/20

OTHER PUBLICATIONS

"Gptrim", Retrieved From: https://github.com/vlad-ds/gptrim, 2024, 2 pages.
Jiang, et al., "(Long)LLMLingua: Enhancing Large Language Model Inference via Prompt Compression", 2024, 10 Pages.
Communication pursuant to Rule 69 EPC—Reminder Concerning Payment of the Designation Fee (Art. 79(2) EPC) and of the Examination Fee (Art. 94(1) EPC)—and Invitation Pursuant to Rule 70a(1) EPC Received in European Application No. 25166367.0, mailed on Oct. 13, 2025, 02 Pages.
Extended European Search Report Received in European Patent Application No. 25166367.0 mailed on Aug. 8, 2025, 08 pages.
Iulia Brezeanu, "How to Cut RAG Costs by 80% Using Prompt Compression", Retrieved from the URL: https://towardsdatascience.com/how-to-cut-rag-costs-by-80-using-prompt-compression-877a07c6bedb/, Jan. 4, 2024, 19 Pages.

* cited by examiner

*Primary Examiner* — Huyen X Vo
(74) *Attorney, Agent, or Firm* — Weaver IP L.L.C.

(57)          ABSTRACT

Systems and methods are disclosed herein for compressing a prompt. In an example system, an importance score listing is obtained that includes a score indicative of an importance of a plurality of dataset keywords. From the importance score listing, a keyword importance score is identified for a plurality of keywords in a current text fragment, such as a text fragment to be compressed. A set of placeholders in an abstract prompt template is populated based on the current text fragment. The current text fragment is compressed based on the importance of the plurality of keywords in the current text fragment to generate a compressed text fragment. In an example, the compressed text fragment is included in the prompt for transmission to a computing entity, such as a large language model of a generative question-answering system.

20 Claims, 6 Drawing Sheets

Obtain an importance score listing that includes a score indicative of an importance of a plurality of dataset keywords — 302

Identify, from the importance score listing, a keyword importance score for a plurality of keywords in a current text fragment — 304

Populate a set of placeholders in an abstract prompt template based on the current text fragment — 306

Compress the populated abstract prompt template based on the keyword importance score for the plurality of keywords in the current text fragment to generate a compressed text fragment, the compressed text fragment included in the prompt for transmission to a computing entity — 308

300

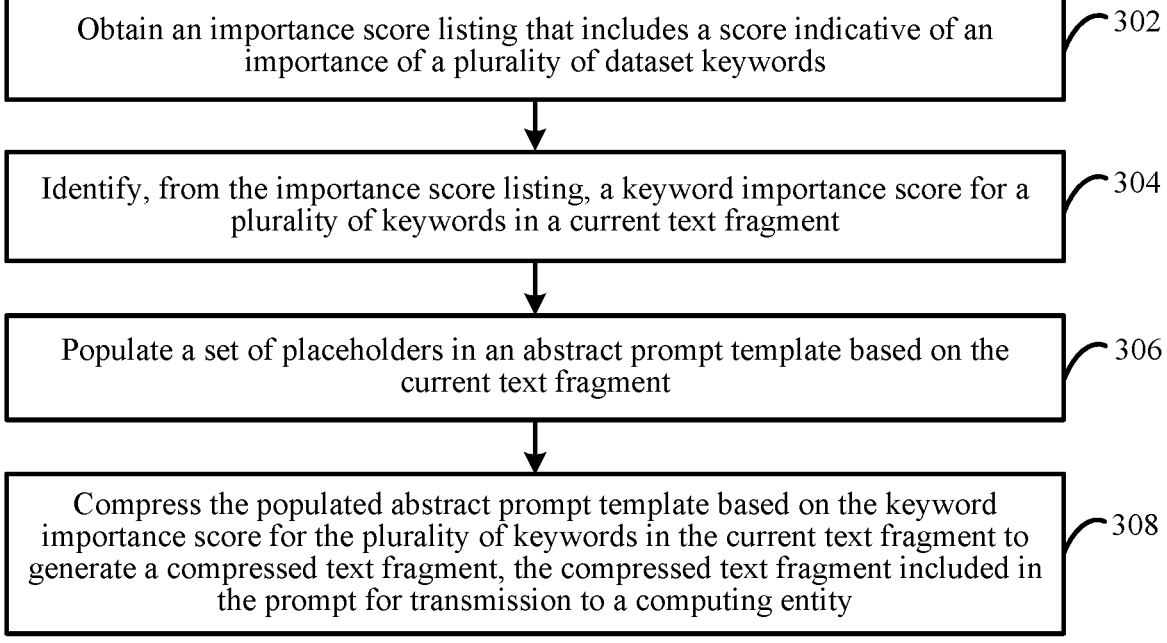

Obtain an importance score listing that includes a score indicative of an importance of a plurality of dataset keywords — 302

Identify, from the importance score listing, a keyword importance score for a plurality of keywords in a current text fragment — 304

Populate a set of placeholders in an abstract prompt template based on the current text fragment — 306

Compress the populated abstract prompt template based on the keyword importance score for the plurality of keywords in the current text fragment to generate a compressed text fragment, the compressed text fragment included in the prompt for transmission to a computing entity — 308

Figures 6, 7, 8, 9:
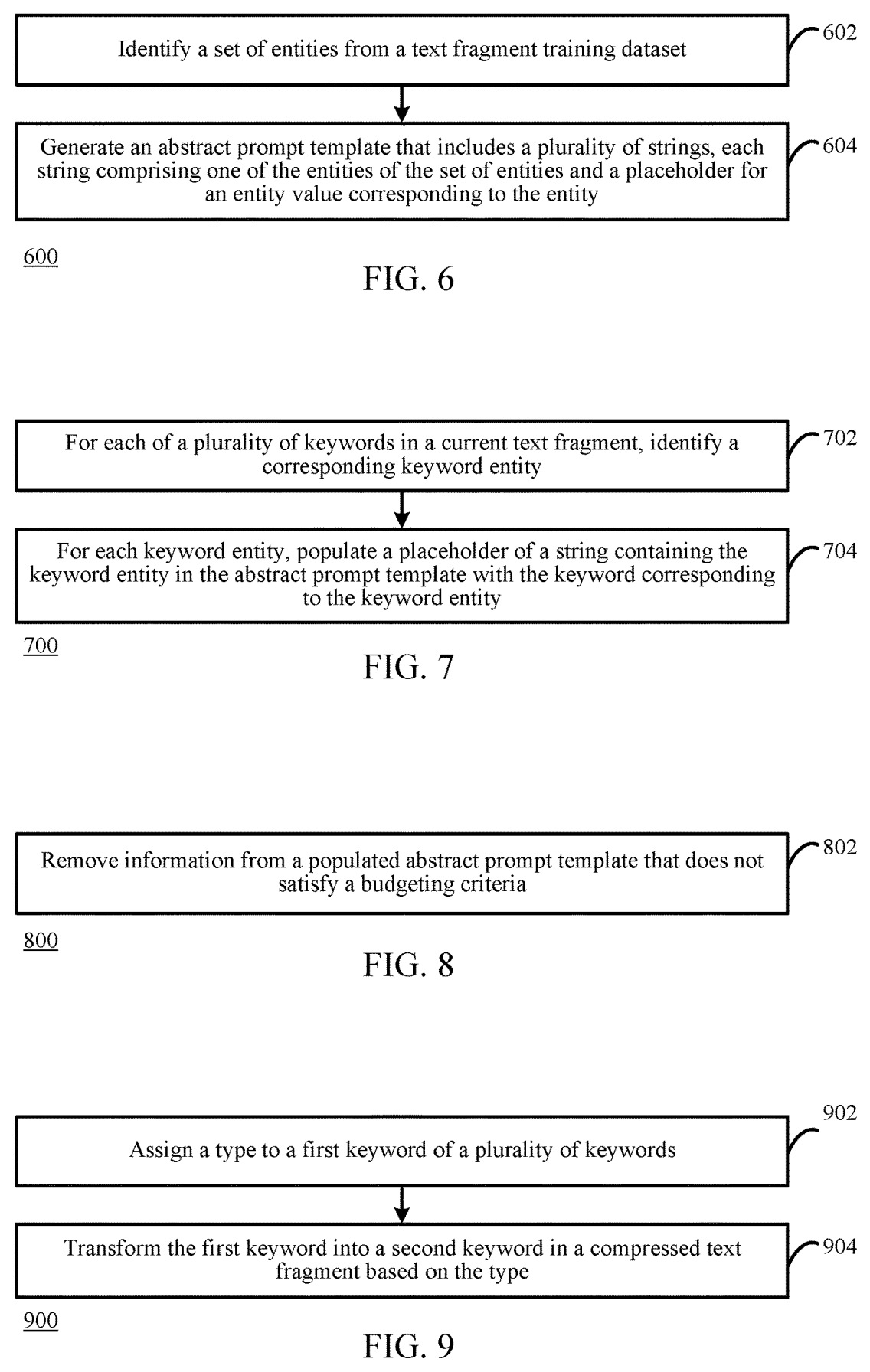

Identify a set of entities from a text fragment training dataset ⌐602

↓

Generate an abstract prompt template that includes a plurality of strings, each string comprising one of the entities of the set of entities and a placeholder for an entity value corresponding to the entity ⌐604

For each of a plurality of keywords in a current text fragment, identify a corresponding keyword entity ⌐702

↓

For each keyword entity, populate a placeholder of a string containing the keyword entity in the abstract prompt template with the keyword corresponding to the keyword entity ⌐704

Remove information from a populated abstract prompt template that does not satisfy a budgeting criteria ⌐802

Assign a type to a first keyword of a plurality of keywords ⌐902

↓

Transform the first keyword into a second keyword in a compressed text fragment based on the type ⌐904

OPTIMIZATION OF RETRIEVAL AUGMENTED GENERATION USING DATA-DRIVEN TEMPLATES

BACKGROUND

Generative question-answering systems in the realm of generative artificial intelligence (AI) are being deployed across various applications and environments, such as in search engines and recommender systems. Often, these generative AI systems are trained on publicly available information and therefore are designed to answer questions based on information in the public domain. In order to use these systems to effectively answer questions in other domains, such as in non-public environments, a supplementation system is employed to identify documents relevant to a given question, and those documents are provided along with the question to the generative AI system to generate an answer. In this manner, a generative AI system can generate an answer based on supplemental content provided to it.

However, such an approach is often costly since the amount of supplemental content provided to a generative AI system can be voluminous. This results in excessive data being transmitted to such systems, utilizing unnecessary resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods are disclosed herein for compressing a prompt. In an example system, an importance score listing is obtained that includes a score indicative of an importance of a plurality of dataset keywords. From the importance score listing, a keyword importance score is identified for a plurality of keywords in a current text fragment, such as a text fragment to be compressed. A set of placeholders in an abstract prompt template is populated based on the current text fragment. The current text fragment is compressed based on the importance of the plurality of keywords in the current text fragment to generate a compressed text fragment. In an example, the compressed text fragment is included in the prompt for transmission to a computing entity, such as a large language model of a generative question-answering system. Compressing a prompt in such a manner reduces network, storage, and computing resources, among other benefits described herein.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 1 shows a block diagram of a system for compressing a prompt, in accordance with an example embodiment.

FIG. 2 block diagram of a system for compressing a prompt, in accordance with another example embodiment.

FIG. 3 shows a flowchart of a method for compressing a prompt, in accordance with an example embodiment.

FIG. 6 shows a flowchart of a method for generating an abstract prompt template that is to be populated with keywords, in accordance with an example embodiment.

FIG. 7 shows a flowchart of a method for populating a placeholder of an abstract prompt template, in accordance with an example embodiment.

FIG. 8 shows a flowchart of a method for removing information in a populated abstract prompt template, in accordance with an example embodiment.

FIG. 9 shows a flowchart of a method of a method for transforming a keyword contained in a current text fragment to a different keyword based on a type associated with the keyword, in accordance with an example embodiment.

Figure 1:
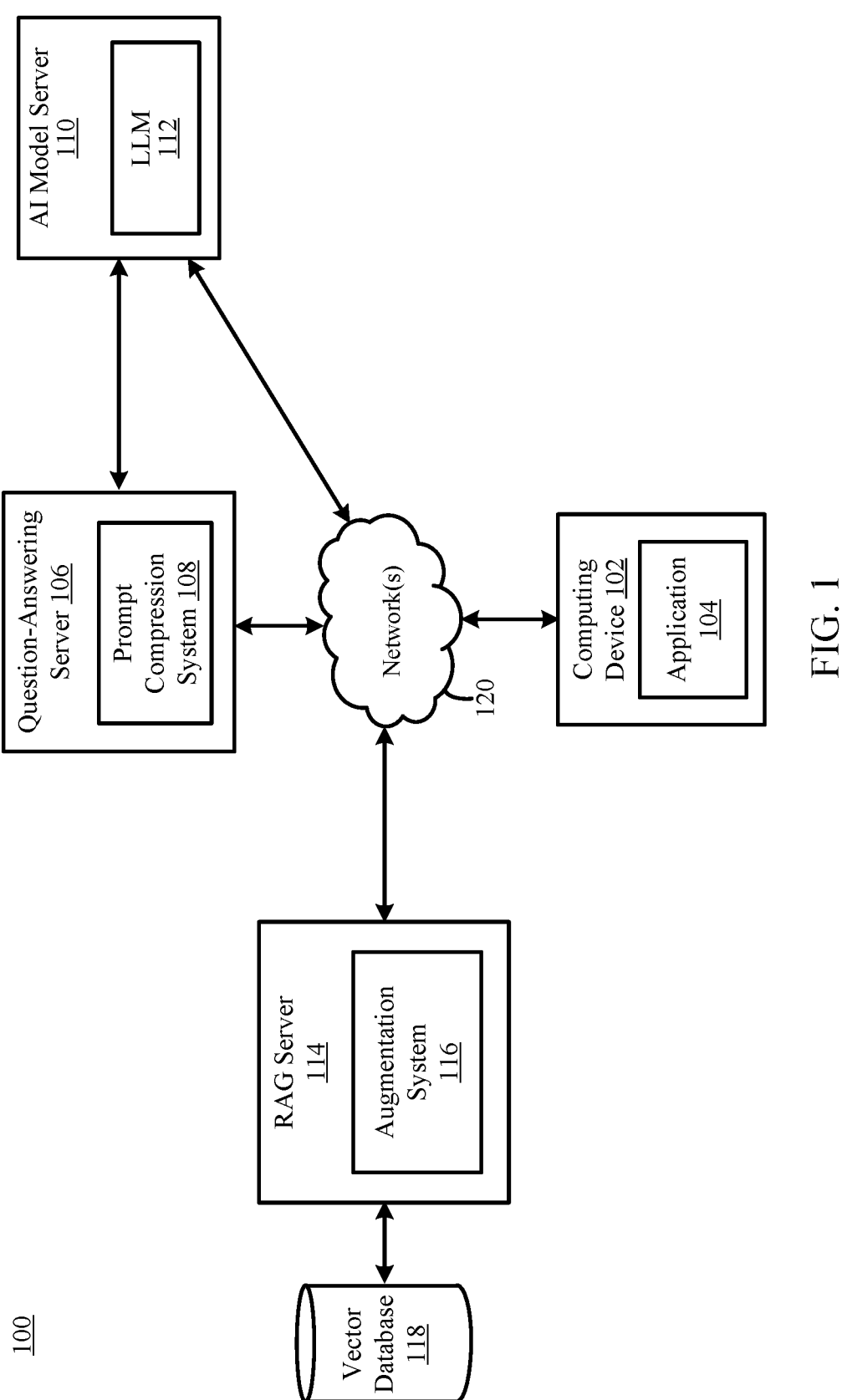

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Generative question-answering systems in the realm of generative AI are being deployed across various applications and environments, such as in search engines and recommender systems. Often, these generative AI systems are trained on publicly available information and therefore are designed to answer questions based on information in the public domain. In order to use these systems to effectively answer questions in other domains, such as in non-public environments, a supplementation system is employed to identify documents relevant to a given question, and those documents are provided along with the question to the generative AI system to generate an answer. In this manner, a generative AI system can generate an answer based on supplemental content provided to it.

However, such an approach is often costly since the amount of supplemental content provided to a generative AI system can be voluminous. This results in excessive data being transmitted to such systems, utilizing unnecessary resources.

In some implementations, prompts transmitted to a generative AI system are transmitted via an application programming interface (API) call, some of which are proprietary. Often, the cost of making an API call to a generative AI system is a function of the length of the prompt. Thus, in scenarios where supplemental data is retrieved and provided in a prompt to a generative AI system, the length of the prompt significantly increases, thereby increasing the cost of the API call.

One technique to reduce the size of the prompt leverages standard text compression techniques, such as by removing common words, stop words, or spaces. Another technique relies upon perplexity techniques that are based on whether certain words are expected in a string of text. However, in each of these approaches, the resulting text after compression can have an altered meaning as a result of the removal of words, which negatively impacts the generative AI system's ability to accurately utilize such text. In addition, the resulting text is often no longer comprehensible by a human, further impacting the AI system's ability to utilize the text. Further, any such compression is not controllable and/or predictable (e.g., the final number of tokens cannot be directly correlated with the loss of information). Rather, the level of compression is determined by the standard compression techniques utilized, which can over-compress or under-compress a set of text.

Embodiments described herein are directed to compressing a prompt. In an example system, an importance score listing is obtained that includes a score indicative of an importance of a plurality of dataset keywords. From the importance score listing, a keyword importance score is identified for a plurality of keywords in a current text fragment, such as a text fragment to be compressed. A set of placeholders in an abstract prompt template is populated based on the current text fragment. The current text fragment is compressed based on the importance of the plurality of keywords in the current text fragment to generate a compressed text fragment. In an example, the compressed text fragment is included in the prompt for transmission to a computing entity, such as a large language model of a generative question-answering system.

Accordingly, example embodiments are directed to techniques for compressing a prompt to transmit to a question-answering model, such as a large language model (LLM). Example embodiments described herein advantageously provide improvements in various areas of computing, including but not limited to, a reduction in the amount of data stored and transmitted (e.g., over a network) in a prompt, and a reduction in the number of processing cycles used to generate an answer based on the compressed prompt. For instance, by compressing text fragments in a controllable manner, the prompts transmitted to question-answering models can be reduced in length, which reduces the amount of data stored on the computing device that transmits the prompt and the computing device that receives the prompt. In addition, the reduction in the size of the prompt also results in a reduction in the amount of data transmitted between computing devices over a network, thereby improving network resource utilization. Still further, by reducing the amount of data (while maintaining its accuracy) in accordance with an embodiment, the LLM can process the data in the prompt quicker in an inference mode during runtime, thus lowering the latency in transmitting answers back to an application utilized by users. In this manner, data that is retrieved by an augmentation system is optimized for transmission to an LLM in a manner that improves the overall system performance.

For instance, in accordance with an embodiment, prompt compression is based on a template-based compression that mitigates the limitations referenced above, among others. Namely, in examples, the compression ratio is related to the loss of information and the resulting compressed prompt is still easily understandable (e.g., by a human or a generative AI model). In addition, examples allow for setting a budget on the compressed prompt (e.g., by limiting a number of desired sentences based on an importance measure), which reduces the length of the prompt, thereby leading to cost reductions in a controlled manner. This controlled way to reduce the size of the prompt is in contrast to other approaches where prompts are compressed in an uncontrolled manner, and often compressed with other negative implications.

Still further, in various examples, the prompts are compressed in a manner that preserves an importance of the uncompressed fragments, which allows the question-answering model to generate accurate answers based on the augmented data included in the prompt, thus enhancing the performance of those systems. In addition, improving the accuracy of question-answering models advantageously improves the functioning of computing devices on which such models are being executed. In particular, by generating accurate answers, repeat questions by users can be minimized and/or avoided, thus preserving the processing resources of those computing devices for other questions (or other purposes altogether). Accordingly, in various examples, a reduction in the cost of using an augmentation system (such as a retrieval augmented generation system, or RAG) in LLMs is achieved, while also ensuring that relevant information (e.g., the most important information) is included in the prompts to the LLM, thus optimizing systems that utilize a RAG. In addition, since the importance scores are generated based on a training dataset that overlaps with the repository of fragments utilized by the RAG, the template utilized during compression (described in greater detail below) is generated in a manner that is driven by data specifically related to a RAG's dataset, thereby further optimizing the compression techniques described herein. Additional benefits and advantages are described later in this disclosure.

Embodiments for compressing a prompt are implemented in various way. For instance, FIG. 1 shows a block diagram of system 100 for compressing a prompt, in accordance with an example embodiment. As shown in FIG. 1, system 100 includes a computing device 102, a question-answering server 106, an AI model server 110, a retrieval-augmented generation (RAG) server 114, a vector database 118, and a network 120. Computing device 102 includes an application 104. Question-answering server 106 includes a prompt compression system 108. AI model server 110 includes an LLM 112. RAG server 114 includes an augmentation system 116. An example device that incorporates the functionality of computing device 102, question-answering server 106, AI model server 110, and/or RAG server 114 (or any subcomponents therein, whether or not illustrated in FIG. 1) is described below in reference to FIG. 10. It is noted that system 100 may comprise any number of devices, including those illustrated in FIG. 1 and optionally one or more further devices or components not expressly illustrated. System 100 is further described as follows.

In an example implementation, network 120 includes one or more of any of a local area network (LAN), a wide area network (WAN), a personal area network (PAN), a combination of communication networks, such as the Internet, and/or a virtual network. In example implementations, computing device 102, question-answering server 106, AI model server 110, and/or RAG server 114 communicate via network 120. In an implementation, any one or more of computing device 102, question-answering server 106, AI model server 110, and/or RAG server 114 communicate over network 120 via one or more application programming interfaces (API) and/or according to other interfaces and/or techniques. In an example, computing device 102, question-answering server 106, AI model server 110, and/or RAG server 114 each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

In examples, computing device 102 comprises any one or more computing devices, servers, services, local processes, remote machines, web services, etc. for interacting with a question-answering model, such as LLM 112. In examples, computing device 102 is configured to execute application 104. In accordance with an embodiment, application 104 enables a user to interface with question-answering server 106 to obtain an answer to a question provided via application 104. In some other examples, application 104 enables a user to interface to AI model server 110 (e.g., without question-answering server 106). In examples, application 104 comprises a resource coupled to a network, including but not limited to computing or processing resources, software resources (e.g., software as a service (SaaS), platform as a service (PaaS), etc.), storage resources (e.g., physical storage devices, local storage devices, cloud-based storages, hard disk drives, solid state drives, random access memory (RAM) devices, etc.), databases, etc. in connection interacting with one or more question-answering systems. In some example embodiments, application 104 is accessible via a cloud.

In various embodiments, application 104 comprises a user interface that is configured to receive a question (also referred to herein as a query or a user query) to be answered. In some examples, the question is received in response to a user input. In various implementations, the question that is received is to be answered by one or more question-answering models, such as LLM 112 or any other model not expressly illustrated. In one example, the question that is received is provided to question-answering server 106, which routes the question to one or more models. In another example, the question that is received via application 104 is transmitted to one or more models without the aid of question-answering server 106. In one such implementation, prompt compression system 108 is implemented on computing device 102 (e.g., as part of application 104, or via another application). In yet another example, prompt compression system 108 is implemented as part of a plugin that interacts with application 104, where the plugin enables communications between application 104 and AI model server 110. In yet another example, application 104 transmits a question to question-answering server 106, while application 104 receives an answer generated by LLM 112 without being routed through question-answering server 106.

In some implementations, application 104 comprises an interface to configure and/or view information of question-answering server 106. For instance, application 104 comprises an interface that includes one or more user interactive controls (e.g., buttons, menus, alphanumeric input fields, icons, windows, etc.) to manage the operation and/or functionality of question-answering server 106, such as configuring and/or viewing a budgeting criteria that defines an amount of compression implemented by prompt compression system 108. Additional details regarding the operation and/or functionality of application 104 will be described below.

In examples, computing device 102 comprises any type of stationary or mobile computing device, including a mobile computer or mobile computing device (e.g., a Microsoft® Surface® device, a personal digital assistant (PDA), a laptop computer, a notebook computer, a tablet computer, a netbook, etc.), a desktop computer, a server, a mobile phone or handheld device (e.g., a cell phone, a smart phone, etc.), a wearable computing device (e.g., a head-mounted device including smart glasses, a smart watch, etc.), an Internet-of-Things (IoT) device, or other type of stationary or mobile device. Computing device 102 is not limited to a physical machine, but may include other types of machines or nodes, such as a virtual machine. In accordance with an embodiment, computing device 102 is associated with a user (e.g., an individual user, a group of users, an organization, a family user, a customer user, an employee user, an admin user (e.g., a service team user, a developer user, a management user, etc.), etc.). In an example, computing device 102 interfaces with other components illustrated in FIG. 1 through APIs and/or by other mechanisms.

Question-answering server 106, AI model server 110, and RAG server 114 are network-accessible servers (or other types of computing devices). In accordance with an embodiment, one or more of question-answering server 106, AI model server 110, and RAG server 114 are incorporated in a network-accessible server set (e.g., a cloud-based environment, an enterprise network server set, and/or the like). Furthermore, as shown in FIG. 1, each of question-answering server 106, AI model server 110, and RAG server 114 are a single server or computing device. Alternatively, any of question-answering server 106, AI model server 110, and RAG server 114 are implemented across multiple servers or computing devices (e.g., as a distributed service) in various embodiments. Each of question-answering server 106, AI model server 110, and RAG server 114 are configured to execute services and/or store data. For instance, as shown in FIG. 1, question-answering server 106 is configured to execute prompt compression system 108, AI model server 110 is configured to execute LLM 112, and RAG server 114 is configured to execute augmentation system 116.

LLM 112 comprises any type of model that generates an output set of data (e.g., an answer) based on an input query (e.g., a question). In various examples, LLM 112 comprises a generative AI model configured to generate a set of data based on a received prompt. In accordance with an embodiment, LLM 112 comprises an LLM. Although implementations are described herein in which AI model server 110 includes an LLM, other models are also present in AI model server 110 in other embodiments, such as a machine learning model configured to map an input to an output (e.g., using a neural network, a machine learning model, or the like). In some examples, AI model server 110 comprises a model other than a generative AI model. Thus, while example embodiments are described with respect to generative AI models such as LLM 112, it should be appreciated that disclosed techniques can be implemented with respect to other types of AI models as well.

In various examples, LLM 112 is trained using public information (e.g., information collected and/or scrubbed from the Internet) and/or data stored by an administrator of their respective model servers. In accordance with an embodiment, LLM 112 comprises "off the shelf" models trained to generate complex, coherent, and/or original content based on (e.g., any) prompt. In an alternative embodiment, LLM 112 comprises specialized models trained to generate data parameters for a domain based on prompts. Additional details regarding the operation of the foregoing models are described elsewhere herein.

In accordance with an embodiment, question-answering server 106 is configured to obtain a question provided (e.g., by a user) via application 104 and generate a prompt containing the question for transmitting to a computing entity, such as LLM 112 of AI model server 110. In examples, LLM 112 generates an answer based at least on the information contained in the prompt (e.g., the question and/or any augmentation data). In implementations, question-answering server 106 provides the prompt to LLM 112 via an API call, or via other interface. Upon generation of the answer, LLM 112 returns the answer (e.g., via an API call response or the like) to question-answering server 106. In response, question-answering server 106 provides the answer to application 104. In some other implementations, LLM 112 provides the answer to application 104 without the aid of question-answering server 106.

In various examples, question-answering server 106 comprises planner/orchestrator that obtains a question (e.g., a user query) via application 104, and transmits a prompt comprising the question to a particular LLM (e.g., via a plugin) from among a plurality of LLMs (e.g., based on the domain, content, etc. of the question). The number and/or arrangement of components in FIG. 1 is illustrative only. In various embodiments, any number of models are available to answer a given question. For instance, any number of AI or LLMs are employed, where each model is configured to answer a question based on the training data upon which the model was trained and/or augmented data, as described herein.

In examples, RAG server 114 is configured to provide a set of augmentation data related to a question received in application 104, where the augmentation data (or a compressed version thereof) is used by LLM 112 to generate an answer. In examples, the augmentation data is based on data (e.g., files, documents, databases, spreadsheets, text, videos, images, etc.) that is not part of a training dataset of LLM 112. For example, while LLM 112 is trained on public information in various examples, augmentation data comprises non-public information (e.g., data based on a company's internal information, private enterprise information, an individual's personal information, medical or healthcare information, other private information, etc.). Augmentation data is not limited to non-public information, however. In various other embodiments, augmentation data includes information that was not used to train LLM 112, such as repositories of information (e.g., literature such as journals and/or textbooks in various fields, such as medicine, science, law, business, arts, engineering, etc.), domain-specific information, public information that comprises data that is more up to date compared to the training dataset of LLM 112, etc. Thus, in examples, the augmentation data RAG server 114 comprises includes any data that was not included in the training of LLM 112 that has relevance to a given question.

In examples, augmentation system 116 is configured to identify a set of augmentation data corresponding to a given question in various ways. In one implementation, augmentation system 116 generates embeddings (e.g., using a language model) for the documents that are accessible to RAG server 114 (e.g., documents that are part of the overall augmentation dataset) and were not used for training LLM 112. It should be understood that while example embodiments refer to such data as documents, this is only illustrative. As described above, augmentation data can include various types of files, and disclosed techniques can be applied to such files in a similar fashion.

In an example, augmentation system 116 is configured to split each document into smaller fragments, where the size of each fragment is less than or equal to a token size or context length that LLM 112 is able to receive and/or process. In accordance with an embodiment, augmentation system 116 generates the embeddings for each fragment (e.g., each portion of the split document), and those embeddings are stored in vector database 118.

In examples, the language model comprises one or more language models that is used to generate a vector or other representation for a word or phrase. In some examples, the language model comprises an embedding model configured to generate an embedding. In examples, an embedding model comprise a deep-learning model that is configured to map a word or sequence of words to a numerical value, such as a multi-dimensional vector. In various implementations, the embedding model is trained based on an algorithm that utilizes language data that comprises the usage of words in a given language, such as books, academic literature, dictionaries, encyclopedias, data available on the Internet, newspapers, other language models, and/or any other language data. In some implementations, the embedding model is trained based on millions or billions of word or word combinations and comprise hundreds or even thousands of dimensions.

Furthermore, in various examples, the language model is trained using various types of learning techniques as will be appreciated to those skilled in the relevant arts, including but not limited to skip-gram, co-occurrence learning, negative sampling, etc. These examples are illustrative only and include other algorithms for training the language model, including any other natural language processing (NLP) or natural language understanding (NLU) methods appreciated to those skilled in the relevant arts.

The language model is generated in various forms. For instance, the language model is generated by applying a suitable supervised and/or unsupervised machine-learning algorithm. For example, the language model is generated by implementing a vector space learning algorithm to generate the embedding model as a vector space model. As a vector space model, the language model represents individual words or sequences of words in a continuous vector space (e.g., a multi-dimensional space), where similar words or sequences of words are mapped to nearby points or are embedded near each other. Furthermore, an artificial neural network learning algorithm is used in some implementations to generate and/or train the language model as a neural network that is an interconnected group of artificial neurons. The neural network is presented with word or sequence of words to identify a representation of the inputted word or sequences of words. The language model could be implemented using any suitable neural network architecture.

When a user query (also referred to as a question) is received at application 104, augmentation system 116 obtains the query and generates an embedding for the query (e.g., using a language model). Augmentation system 116 performs a similarity search of the embedding corresponding to the query with embeddings stored in vector database 118 to identify stored embeddings that have a similarity above a threshold in examples. For those embeddings that have a similarity above a threshold, augmentation system 116 retrieves the documents (or fragments) corresponding to the embeddings. Example methods for measuring similarity between embeddings include, but are not limited to, cosine-similarity, Euclidean distance similarity, dot product similarity, Jaccard similarity, Levenshtein similarity, and/or any other technique suitable for measuring similarity between embeddings.

In accordance with an embodiment, the retrieved documents (or fragments) are provided to prompt compression system 108, where the documents (or fragments) are compressed for inclusion in a prompt (that also includes the query) to be transmitted to LLM 112. In this manner, LLM 112 obtains a query along with relevant documents corresponding to the query, such that LLM 112 generates an answer to the query based on a combination of its own training (based on public information) and the augmented data selected by augmentation system 116. The answer is then returned to application 104, such that the answer is displayed therein.

In accordance with an embodiment, prompt compression system 108 is configured to compress one or more fragments of text to generate a compressed prompt that is transmitted to LLM 112. For instance, prompt compression system 108 obtains one or more fragments of text corresponding to a question provided at application 104. Such fragments of text comprise augmentation data in various implementations, where the augmentation data is received from a repository that is local to and/or remotely stored.

In accordance with an embodiment, upon obtaining a text fragment (e.g., augmentation data corresponding to a question), prompt compression system 108 extracts keywords from the text fragment and identifies an importance score to each keyword based on an importance score listing. Prompt compression system 108 populates an abstract prompt template based on the keywords and importance scores in examples, resulting in a structured form for the text fragment. A budgeting criteria is then applied to the populated template to determine which portions of text should be included in the prompt and/or which portions should not be included. In this manner, a compressed form of the text fragment is generated for inclusion in the prompt, resulting in a compressed prompt. The compressed prompt (which includes the question to be answered and any number of additional compressed text fragments) is then transmitted to LLM 112, which generates an answer to the question based on the information contained in the prompt and/or other information upon which LLM 112 was trained (e.g., public domain information).

As noted elsewhere herein, the cost of making an API call to an LLM is typically a function of a length (e.g., a number of tokens) of the prompt. Where a RAG system is implemented, the tokens can be arbitrary large, as the RAG system can retrieve lengthy and/or voluminous documents from a vector database that are to be included in a prompt for the LLM. By compressing the information in the prompt in accordance with disclosed techniques, the cost of utilizing a generative AI system is reduced.

It should also be understood that although examples are described herein in which augmentation data is compressed for inclusion in a prompt, it is contemplated that the disclosed techniques can be applied in other scenarios as well, such as compressing prompts that do not contain augmentation data. Additional details regarding the operation and functionality of prompt compression system 108, and various other related components, are described below.

Implementations are not limited to the illustrative arrangement shown in FIG. 1. For instance, any of the components shown in FIG. 1 are located in a same computing device, are co-located, or are located remote from each other. Furthermore, system 100 comprises any number of other devices, networks, servers, and/or computing devices coupled in any manner in various embodiments.

Figure 2:
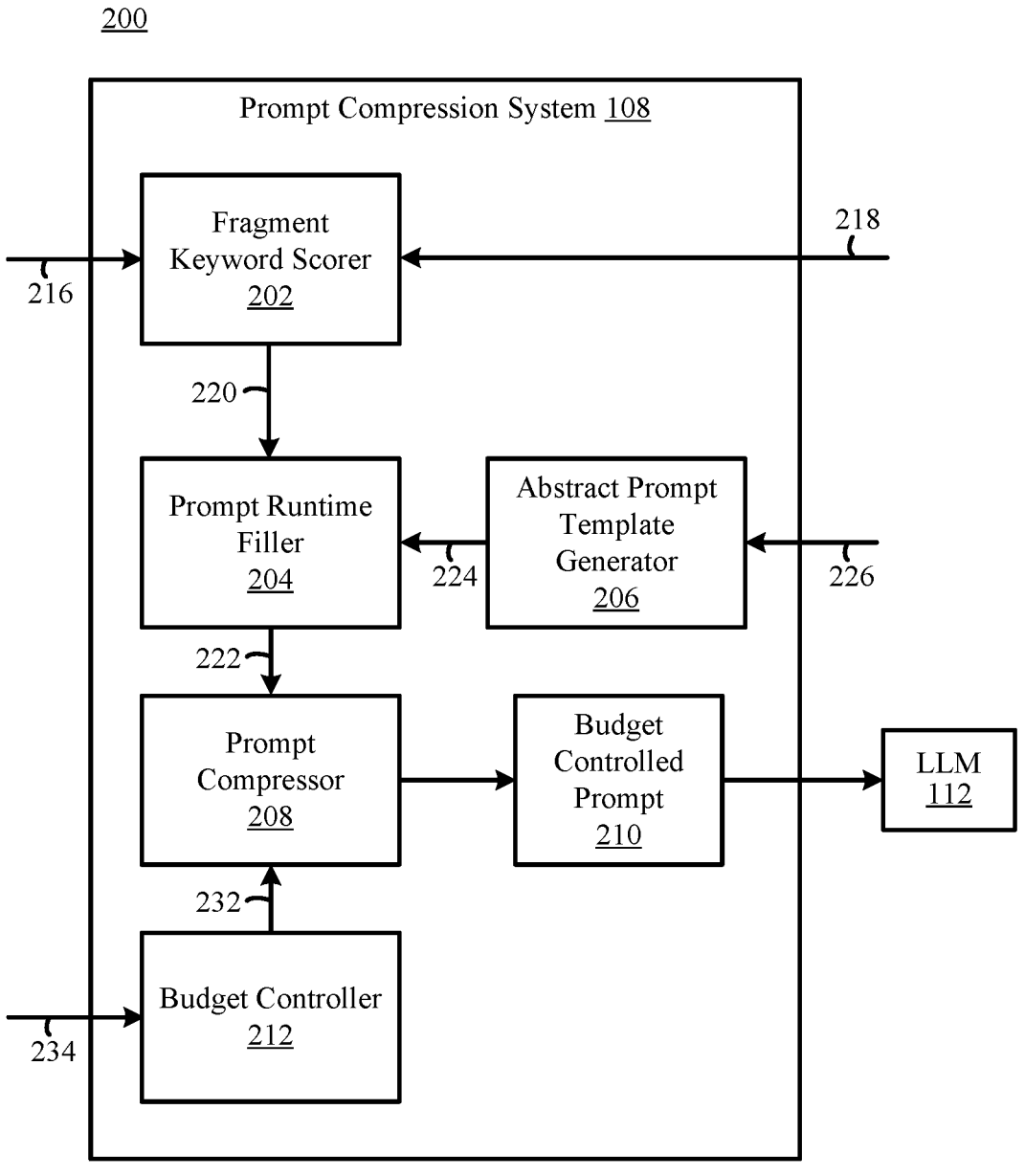

FIG. 2 depicts a block diagram of a system 200 for compressing a prompt, in accordance with another example embodiment. As shown in FIG. 2, system 200 includes an example implementation of prompt compression system 108 and an example implementation of LLM 112. As shown in FIG. 2, prompt compression system 108 includes a fragment keyword scorer 202, a prompt runtime filler 204, an abstract prompt template generator 206, a prompt compressor 208, a budget controlled prompt 210, and a budget controller 212.

In accordance with an embodiment, fragment keyword scorer 202 is configured to obtain a current text fragment 216 and an importance score listing 218. In an example, current text fragment 216 comprises a fragment of text (e.g., a token, a document, etc.) identified and/or provided by augmentation system 116 corresponding to a question provided at application 104, such that the current fragment of text comprises an item of augmentation data to be provided or injected (at least in part) as a prompt, along with a question, to an LLM-based application, such as LLM 112. As used herein, a fragment of text or a text fragment (including the current fragment of text) refers to any string of text and/or a set of concatenated strings of text. In examples, a fragment comprises a list of words. In other examples, the text fragment comprises a sentence, line, a paragraph, or a page. In yet other examples, the text fragment comprises a document.

In examples, importance score listing 218 is a listing that identifies importance scores for each of a plurality of keywords in a dataset of documents. In an implementation, the importance score listing is generated based on an analysis (e.g., using one or entity recognition models, keyword extraction models, or other language models) of dataset of documents. In examples, the dataset comprises the documents in a repository from which augmentation system 116 identifies data relevant to a user query (e.g., based on embedding similarities, as discussed elsewhere). In one example, the dataset comprises the complete set of augmentation data from which augmentation system 116 selects relevant documents. In another example, the dataset comprises a subset of such documents (e.g., based on a filtering criteria to remove duplicative or similar documents).

In accordance with an embodiment, importance score listing 218 comprises a list of tuples based on the dataset, such as a unified list of tuples, that identifies keywords, entities, and importance scores. In some examples, the tuples also comprise a type associated with the keyword (e.g., whether the keyword is a number or a category). In a further example, the list of tuples is ranked (e.g., ordered) based on the importance scores (e.g., from highest to lowest, such that the most important keywords are at the beginning).

In an illustration, the list of tuples comprises the following information: $[(k_i, e_i, t_i, s_i), (k_{i+1}, e_{i+1}, t_{i+1}, s_{i+1}), \ldots]$, where k identifies a keyword in the dataset, e identifies an entity associated with the keyword, t identifies a type associated with the keyword, and s identifies an importance score of the keyword. In implementations, a tuple is generated for each keyword in the dataset, thus resulting in a data structure that comprises a ranking score for each combination of keyword, entity, and data type. In examples, the data structure that stores the tuples comprises any suitable structure, such as a listing, a table, a database, spreadsheet, document, etc.

In implementations, fragment keyword scorer 202 is configured to extract keywords from current text fragment 216. For each of the extracted keywords, fragment keyword scorer 202 identifies a corresponding importance score, entity, and optionally a type, based on information contained in importance score listing 218. In some implementations, fragment keyword scorer 202 identifies such information by performing a lookup in importance score listing 218. In this manner, a new set of tuples 220 is created for keywords in the current text fragment, where each tuple identifies (for a given keyword of the current text fragment) the keyword, importance score, entity, and/or type.

In examples, fragment keyword scorer 202 is configured to extract keywords from the current text fragment in various ways, such as by applying a keyword extraction model or other language model that outputs keywords from an input text fragment. An example of a keyword extraction model is described below with respect to FIG. 4. In some other examples, fragment keyword scorer 202 is configured to extract all words contained in the current text fragment as the set of keywords for the current text fragment. It should be noted that extracting keywords is performed in real-time in some examples (e.g., upon receiving a current text fragment from an augmentation system). However, in other examples, keyword extraction is performed on text fragments in advance (e.g., extracted keywords for each text fragment are stored in a repository coupled to prompt compression system 108 and/or augmentation system 116. In one example, the extracted keywords of a current text fragment are provided by augmentation system 116 to prompt compression system 108, in addition to, or as an alternative to, the current text fragment itself.

As described below, fragment keyword scorer 202 need not separately generate importance scores for keywords in the current text fragment (e.g., by applying a language model to generate importance scores), as importance scores are generated previously (e.g., offline) and stored in the importance table. In other words, the importance of keywords across an entire training dataset is learned in an offline manner in examples, which can improve the speed of prompt compression for current text fragments in real-time. Rather, keywords only need to be extracted and matched to their importance scores that were previously identified from the training dataset, thereby improving the real-time performance. As a result, identifying importance scores by fragment keyword scorer 202 is performed with reduced computing and latency in various implementations.

In an embodiment, abstract prompt template generator 206 is configured to obtain a list of entities 226 and generate an abstract prompt template 224 based thereon. In examples, the list of entities comprises a complete list of entities across the keyword dataset (e.g., the same dataset from which the importance score listing was generated). In other words, the list of entities comprises all entities that were recognized across the dataset in examples. In some further implementations, the list of entities comprises a subset of such entities.

In yet some other implementations, the list of entities comprises a complete list of entities (or a subset thereof) from an entity recognition model (an example of which is described in greater detail below).

Based on the list of entities, abstract prompt template generator 206 generates abstract prompt template 224 that identifies, for each entity in the list of entities, a placeholder for a corresponding entity value. In various embodiments, abstract prompt generator 204 generates the template offline (i.e., prior to a runtime in which a current text fragment is compressed).

In some implementations, each entity and corresponding placeholder is arranged as a string (e.g., a phrase or a sentence). In some implementations, each entity and corresponding placeholder is stored in a row of a table, such that each row of the table comprises a different entity and corresponding placeholder. An illustration of a set of strings that is included in abstract prompt template 224 is as follows: "[Entity A] is [placeholder value], [Entity B] is [placeholder value], . . . " where Entity A, Entity B, . . . , identify entities in the list of entities 226, and the placeholder values are unspecified (i.e., remain as placeholders) until a later phase (e.g., during runtime). This is only an illustration of a set of strings, and it should be understood that abstract prompt template generator 206 generates an abstract prompt template in any manner, and/or in any other arrangement or structure. For instance, the abstract prompt template includes any more (or less) words and/or granularity (such as to make each string more or less descriptive). In some cases, each string is crafted to improve a semantic understandability thereof. In yet another example, some strings have different structures than other strings (e.g., a different sentence form and/or level of sophistication) based on the entity.

In example embodiments, prompt runtime filler 204 is configured to obtain tuples 220 and abstract prompt template 224 from abstract prompt template generator 206. For instance, prompt runtime filler 204 obtains an abstract template to be populated, and a set of tuples that comprise keywords, entities, scores and/or types. In accordance with an embodiment, prompt runtime filler 204 is configured to populate abstract prompt template 224 (which was generated previously, or offline) based on information contained in tuples 220. In examples, prompt runtime filler 204 is configured to populate the template during runtime (e.g., when a current text fragment is being analyzed for compression). As used herein, populate refers to filling in one or more placeholders of the abstract prompt template. In examples, such populating occurs in various ways, such as by inserting values into the template or creating a new data structure (such as a table, document, etc.) that comprises one or more strings of the abstract prompt template for which values are being inserted. In other words, a new data structure containing one or more populated strings of the abstract prompt template is generated in some implementations.

In examples, prompt runtime filler 204 populates the abstract prompt template based on values obtained in the set of tuples for a specific text fragment. For instance, for a given keyword that is identified in the set of tuples, the entity corresponding to the keyword is identified in the abstract prompt template. For that identified entity in the abstract prompt template, the keyword is inserted into the placeholder value corresponding to the entity. In this manner, one or more placeholders values of the abstract prompt template are filled in with concrete values identified in the set of tuples.

In examples, prompt runtime filler 204 is also configured to rank or re-order the strings of abstract prompt template based on the importance scores for each keyword, as specified in the set of tuples. For instance, the highest importance keywords are identified at the beginning, while the lowest importance keywords are identified at the end. In this manner, the abstract prompt template is structured to identify entities and their associated keywords in an order of relative importance. This resulting arrangement is referred to as a populated abstract prompt template 222.

In some further examples, if multiple values are identified for the same entity in a set of tuples, prompt runtime filler 204 adds an additional row to populate the additional values of a given entity.

As a non-limiting illustration, an abstract prompt template specifies the following strings: "Person is [placeholder value]. City is [placeholder value]." If the tuples of the form $(k_i, e_i, s_i)$ contained the following information "(Bob, person, 35), (Alice, person, 72), (Seattle, city, 64)," then the abstract prompt template would be populated as follows: "Person is Alice. City is Seattle. Person is Bob." It should be understood that this example is only an illustration, and any number of strings are possible, depending on the complexity and/or breadth of the abstract prompt template and a given text fragment.

Accordingly, for each text fragment, prompt runtime filler 204 transforms the text fragment (which can be unstructured or natural language text) into a collection of organized sentences (e.g., a structured form). Although the text fragment is transformed in such a manner in examples, underlying content of the text fragment is preserved but rather presented in a structured form that aids in the compression process, as described elsewhere herein.

In examples, prompt compressor 208 is configured to obtain populated abstract prompt template 222 and compress the populated abstract prompt template to generate budget controlled prompt 210. In examples, prompt compressor 208 compresses the populated abstract prompt template based a budgeting criteria 232 received from budget controller 212.

In various embodiments, populated abstract prompt template 222, as discussed herein, comprises a populated abstract prompt template for a current text fragment that is ordered based on importance scores of keywords in the current text fragment. Prompt compressor 208 is configured to selectively keep and/or remove one or more strings from populated abstract prompt template 222 to generate a compressed version of the current text fragment. For example, prompt compressor 208 is configured to remove strings from the populated abstract prompt template based on an input 234 received by budget controller 212 that specifies a budgeting criteria 232. In implementations, input 234 comprises a user input, a default value, or an automatically determined value (e.g., a value that is adjusted based on the size of the current text fragment).

In an example, the budgeting criteria comprises a parameter that identifies a value above or below which strings should be kept or removed from the populated abstract prompt template. In one example, the budgeting criteria specifies compression ratio. For instance, the compression ratio comprises a percentage of strings to keep (or remove) for compression, such as a parameter that indicates that the top 70% of strings should be kept, while the bottom remaining 30% of strings should be discarded (where the strings are ordered in importance from highest to lowest). In another example, the budgeting criteria specifies an importance threshold, such as a minimum importance score that each string should have in order for the string to remain in the compressed fragment. In yet another example, the budgeting criteria identifies a fixed number of strings to keep or discard. In yet another example, prompt compressor 208 is configured to automatically discard any strings for which a placeholder was not specified (e.g., before or after a budgeting criteria is applied). In yet another example, the budgeting criteria comprises a combination of different parameters (e.g., a percentage and an importance threshold). These examples are only illustrative, and it should be understood that the budgeting criteria defines any measure by which strings of the populated abstract prompt template are kept and/or removed for inclusion in the budget controlled prompt.

Accordingly, in this manner, strings which have a relatively low importance are discarded, allowing budget controlled prompt 210 to contain the most important data for transmission to LLM 112. In other words, budget controlled prompt 210 contains the most important entities and keywords from relevant document, thereby allowing the prompt to have a reduced size. Accordingly, in examples, prompt compressor 208 is configured to control (e.g., based on the budgeting criteria) the amount of compression to perform, in a predictable manner, while also maintaining the relatively important content of a given text fragment in an understandable structured form.

In embodiments, prompt compressor 208 is configured to compress a plurality of different text fragments in a similar fashion, where each text fragment is similarly retrieved from augmentation system 116. For instance, for each text fragment, fragment keyword scorer 202 extracts keywords contained therein and identifies importance scores, entities, and/or types for each keyword. Prompt runtime filler 204 populates an abstract prompt template for each text fragment, and prompt compressor 208 obtains populated abstract prompt template 222 for each text fragment in a similar manner as described herein. In examples, prompt compressor 208 applies a budgeting criteria to the populated abstract prompt template for each text fragment to generate a plurality of compressed fragments, where each compressed fragment corresponds to a text fragment retrieved from augmentation system 116. In such an example, prompt compressor 208 combines (e.g., concatenates) the compressed fragments, along with the user query presented via application 104, to generate budget controlled prompt 210. In some implementations, budget controlled prompt 210 comprises a plurality of prompts, such as where a total length of the compressed fragments and the user query exceeds a context length of a prompt. In these instances, the budget controlled prompt is split into a plurality of prompts that collectively comprise the compressed fragments and the user query.

In an example, the user query is not compressed in budget controlled prompt 210, while the text fragments retrieved from augmentation system 116 are compressed. In this manner, the budget controlled prompt comprises a portion of uncompressed information and a portion of compressed information.

In accordance with one or more embodiments, a text fragment for inclusion in a prompt is compressed in various ways. For example, FIG. 3 shows a flowchart 300 of a method for compressing a prompt, in accordance with an example embodiment. In an embodiment, flowchart 300 is implemented by system 100 as shown in FIG. 1 and/or system 200 as shown in FIG. 2. Accordingly, flowchart 300 will be described with reference to FIGS. 1 and 2. Other structural and operational embodiments will be apparent to persons skilled in the relevant art(s) based on the following discussion regarding flowchart 300, system 100 of FIG. 1 and system 200 of FIG. 2.

Flowchart 300 begins with step 302. In step 302, an importance score listing that includes a score indicative of an importance of a plurality of dataset keywords is obtained. For instance, with reference to FIG. 2, fragment keyword scorer 202 obtains importance score listing 218 that includes a score indicative of an importance of each of a plurality of dataset keywords. For instance, as described elsewhere, the dataset from which the dataset keywords are extracted comprises a dataset of the documents (or a subset thereof) retrievable by augmentation system 116 for inclusion in a prompt as augmentation data. Collectively, the dataset from which the dataset keywords are extracted is also referred to as a training dataset. In examples, the importance score listing identifies, for each of a plurality of keyword in the dataset, an importance score of the keyword, an entity associated with the keyword, and optionally a type associated with the keyword.

In examples, importance score listing 218 comprises an output (e.g., a table, database, or other data structure) of a keyword importance scorer component that analyzes and scores keywords of the training dataset. Additional details regarding the generation of importance score listing 218 are described elsewhere herein, including but not limited to the discussion relating to FIGS. 4 and 5.

In step 304, a keyword importance score for a plurality of keywords in a current text fragment is identified from the importance score listing. For instance, with reference to FIG. 2, fragment keyword scorer 202 is configured to identify a keyword importance score for a plurality of keywords in current text fragment 216 from importance score listing 218. As discussed above, current text fragment 216 comprises a fragment of text obtained from augmentation system 116, where augmentation system 116 identifies the text fragment as being relevant (e.g., based on a vector similarity) to a user query transmitted to the augmentation system, such that the text fragment is to be provided to a question-answering model to generate an answer based at least on the identified fragment.

In an embodiment, the fragment keyword scorer 202 extracts the plurality of keywords from current text fragment 216 by applying a keyword extraction model (or via other means as described herein) to current text fragment 216, resulting in a list of keywords contained in the current text fragment. For each such keyword, fragment keyword scorer 202 obtains the entity associated with the keyword, and the importance score associated with the keyword from importance score listing 218 in various examples. In a further embodiment, fragment keyword scorer 202 obtains a type associated with each keyword from importance score listing 218.

Based on accessing importance score listing 218 for keywords extracted from a current text fragment, fragment keyword scorer is configured to generate tuples 220 that each contain a keyword (k) in the dataset, an entity (e) associated with the keyword, and an importance score(s) for the keyword. In some implementations, the tuples include a type (t) associated with the keyword. In examples, the tuples are stored in any suitable data structure in any arrangement and/or order.

In step 306, a set of placeholders in an abstract prompt template is populated based on the current text fragment. For instance, with reference to FIG. 2, prompt runtime filler 204 is configured to obtain tuples 220 and abstract prompt template 224, and populate abstract prompt template 224 based at least on the keywords and associated entities in the current text fragment. In examples, the keywords and associated entities are obtained from tuples 220.

For instance, using the information contained in tuples 220 (which is based at least in part on information contained in the current text fragment), a placeholder value for one or more entities in the abstract prompt template is populated with a corresponding keyword identified in tuples 220. In this manner, the current text fragment is transformed (which is unstructured in various examples) into a structured form comprising a plurality of strings. In various examples, the strings are reorganized in the abstract prompt template based on the importance scores for each keyword, as identified in tuples 220, thereby resulting in a structured and ordered (e.g., highest to lowest, or lowest to highest) arrangement of a series of strings (e.g., sentences) that represent the current text fragment and contain relevant information therefrom.

In step 308, the populated abstract prompt template is compressed based on the keyword importance score for the plurality of keywords in the current text fragment to generate a compressed text fragment, where the compressed text fragment is included in the prompt for transmission to a computing entity. For instance, with continued reference to FIG. 2, prompt compressor 208 is configured to compress populated abstract prompt template 222 based on the keyword importance score for the plurality of keywords in current text fragment 222, as identified in tuples 220, resulting in the generation of a compressed text fragment. In examples, prompt compressor 208 determines the amount of compression to utilize based on application of budgeting criteria 232 to populated abstract prompt template 222. For instance, if budgeting criteria 232 specifies that a certain percentage of strings is to be kept, prompt compressor 208 is configured to keep only a percentage of the strings of the populated abstract prompt template (which is populated with concrete values in examples) based on the scores (e.g., keeping the top 50% of the strings, as ordered by the importance scores of their respective keywords).

In accordance with an embodiment, prompt compressor 208 combines the compressed text fragment with any other compressed text fragments generated in a similar fashion (depending on whether and how many other text fragments were identified by augmentation system 116), along with the user query, to generate budget controlled prompt 210. In example implementations, budget controlled prompt is then transmitted (e.g., as one or more API calls) for use in an LLM-based application, such as LLM 112, allowing LLM 112 to generate an answer to the query based at least on the information contained in budget controlled prompt 210.

In examples, since each string of the populated abstract prompt template is associated with an importance score (e.g., the importance score corresponding to the keyword in the string), prompt compressor 208 is able to apply budgeting criteria 232 from budget controller 212 to cut the size of the information contained in the populated template, and keep only a desired amount of strings (e.g., based on a total number, a percentage, etc.). In this manner, a controlled reduction in the length of a text fragment is achieved, which results in controlled reduction in the size of the prompt (that contains the compressed text fragment) transmitted to LLM 112 over a network.

In examples, various advantage are possible. For instance, disclosed techniques utilize data-driven templates (e.g., abstract prompt template, which is then populated to create a populated template) based on various types of language models (e.g., named entity recognition models, keyword extraction models, etc., as described in greater detail below)

to represent text fragments as an organized series of strings that is ranked by relative importance. In addition, a budget criteria is applied that limits the number of desired strings in the compressed text fragment, thereby reducing the length of prompt transmitted to LLMs. In this manner, cost reductions and various computing resource reductions are achieved in a controlled manner. Such techniques are in contrast to other approaches in which prompts are not compressed, or compressed in an uncontrolled fashion using vastly different techniques.

In addition, compressed text fragments generated in accordance with the disclosed techniques are still able to be read and understood by humans and/or LLMs. This is unlike other approaches which remove words or entire series of words from the prompts in a manner that results in an incomprehensible and/or grammatically incorrect sentences that are no longer interpretable.

In yet another example, the disclosed techniques are implementable and/or integrated into existing question-answering systems, such as those that utilize a RAG, without undue engineering effort. In this way, compatibility with an established infrastructure can be maintained without requiring substantial system modifications.

While certain example embodiments are described herein in which the compressed text fragment is included in a budget controlled prompt for use by an LLM, it is contemplated that the compressed text fragment is used in other environments as well. For instance, techniques disclosed herein allow for compressing any set of text into a smaller structured form for various other tasks, such as to generate representations of documents that can be stored in a manner that conserves storage resources.

Figure 4:
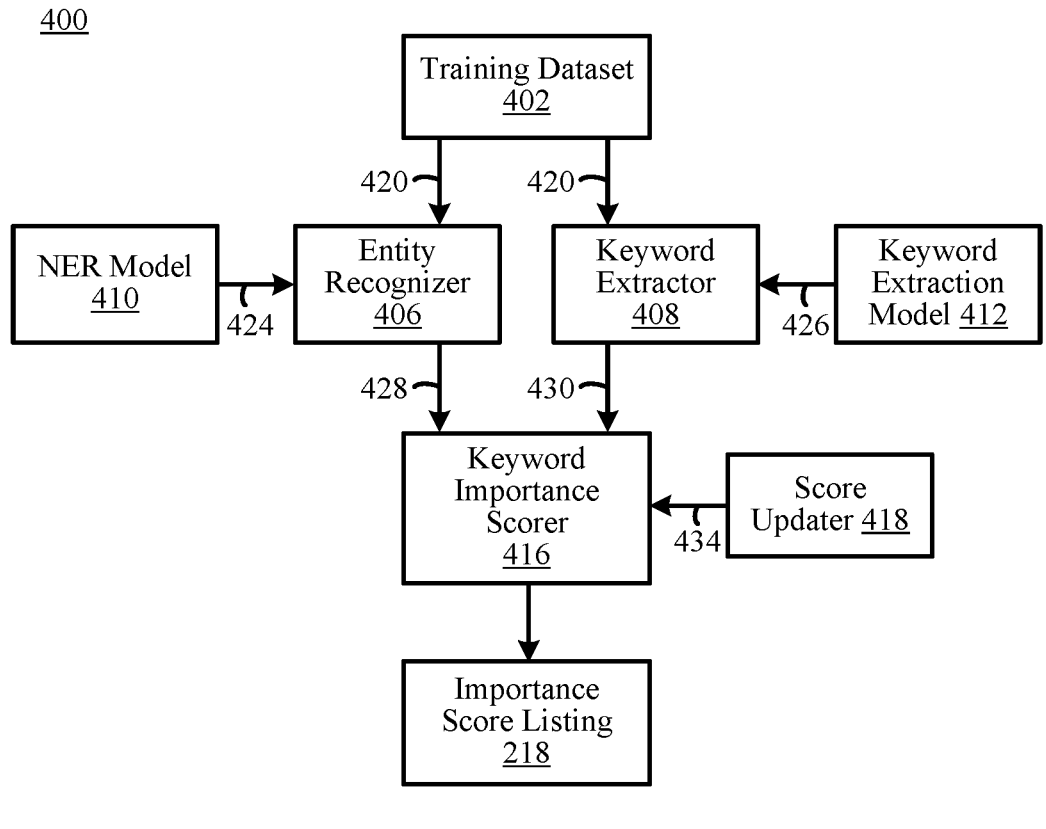
FIG. 4 shows a block diagram of a system for generating an importance score listing for a plurality of keyword, in accordance with an example embodiment.

As described above, the compressed text fragment is based at least in part on an importance score listing that is generated offline in various examples. For example, FIG. 4 shows a block diagram of a system 400 for generating an importance score listing for a plurality of keyword, in accordance with an example embodiment. System 400 comprises a training dataset 402, an entity recognizer 406, a keyword extractor 408, a named entity recognition (NER) model 410, a keyword extraction (KE) model 412, a keyword importance scorer 416, a score updater 418, and an example implementation of importance score listing 218.

In accordance with an embodiment, training dataset 402 comprises a complete dataset of documents accessible by augmentation system 116 from which augmentation data (or text fragments thereof) are retrievable and provided to prompt compression system 108. In some implementations, training dataset 402 comprises a subset of such documents, such as a subset based on a representative sample of a complete set of documents utilized by augmentation system 116.

In some further embodiments, training dataset 402 comprises a plurality of text fragments 420, where each text fragments is at least a partial segment of a document in the dataset. For instance, each document in the dataset is split into smaller portion, such as text fragments that comprise one or more sentences, paragraphs, pages, lines, chapters, etc. In this manner, each text fragment represents a portion of a larger document. In some implementations, a text fragment comprises an entire document. Collectively, such text fragments comprise training dataset 402 in examples.

In examples, entity recognizer 406 is configured to obtain text fragments 420 and recognize entities associated entity values contained therein. In an embodiment, entity recognizer 406 is configured to apply NER model 410 (or a plurality of NER models) to identify entities and associated values 424. In implementations, any suitable NER model or technique is employed for this purpose, including but not limited to bert-base-NER from HuggingFace, ne_chunk from NLTK (Natural Language Toolkit), conditional random field (CRF) models, classification models, rule-based extraction techniques (e.g., using key phrases), or others.

As used herein, a keyword value (or an entity value) refers to the value of an entity. An entity refers to a type of an object that exists in a given sentence (e.g., a person, identification number, place, address, age, or any other type of information. For instance, an entity value is the name of a person or organization as it is recited in a sentence, where name and person represent entities. As an illustration, if an entity is a location, the cities "New York City" and "Los Angeles" present in a fragment are identified as entity values of the entity "location." In some examples, entity values for a default or catch-all entity (e.g., a general class) are identified for words that are not recognized as belonging to other named entities.

For example, entity recognizer 406 analyzes each text fragment using NER model 410 to make associations between a set of entities [entity 1, entity 2, . . . ] and words from the text fragments. In accordance with an embodiment, the output of entity recognizer 406 is a list of tuples 428 consisting of keywords and their associated entities. The tuples are stored in any suitable data structure. In one example, the tuples are stored as [(k1, e1), (k2, e2), . . . ], where k represents a keyword value, and e represents an associated entity. In another example, the tuples are stored as: [e1, [k11, k12, . . . ]; e2, [k21, k22, . . . ]], where [k11, k12, . . . ] comprises a list of keyword values associated with an entity e1, [k21, k22, . . . ] comprises a list of keyword values associated with an entity e2, and so on. These arrangements are only illustrative, and other formats for storing tuples 428 are contemplated.

In some examples, entity recognizer is also configured to assign a type to each keyword, such as an indication of whether the keyword is a numerical keyword or is a category. Such information is also stored in tuples 428 in examples.

In examples, keyword extractor 408 is configured to obtain text fragments 420 and extract each word (e.g., each keyword) therefrom and assign an importance score to each keyword. In various embodiments, keyword extractor 408 is configured to obtain text fragments 420 in parallel with entity recognizer 406 obtaining text fragments 420.

In an embodiment, keyword extractor 408 extracts keywords and assigns importance score to the keywords based on application of keyword extraction model 412. Keyword extraction model 412 comprises any type of model that analyzes a fragment of text (e.g., a sentence) to identify keywords contained therein. In various embodiments, keyword extraction model 412 also generates an importance score 426 for each such keyword that represents a level of importance that keyword has, such as an importance relative to other words in the text fragment (or across a plurality of text fragments). Any number of keyword extraction models are used to extract keywords and/or assign importance scores. In implementations, any suitable extraction and/or scoring model or technique is employed for these purposes, including but not limited to keyBERT (keyword extraction using Bidirectional Encoder Representations from Transformers), keyLLM, rake-nltk (Rapid Automatic Keyword Extraction Natural Language Toolkit), or others (e.g., custom models). In some examples, a plurality of models are applied to generate a plurality of importance scores for a keyword, which are then combined (e.g., averaged) into a single importance score for the keyword.

In accordance with an embodiment, the output of keyword extractor 408 is a list of tuples 430 that comprise extracted keywords and their associated scores. In one illustration, the tuples are arranged as follows: [(k1, s1), (k2, s2), . . . ], where k represents the keyword, and s represents an importance score generated for the keyword. In some implementations, filtering is performed on tuples 430 to remove certain types of words that are inferred to have low importance scores, such as articles, prepositions, etc. In examples, the importance score comprises a value (e.g., a numerical value, a letter value, a grade, etc.) between a minimum and maximum value, where the minimum value indicates that the keyword has no importance and the maximum value indicates that the keyword has the level of importance.

In accordance with an embodiment, keyword importance scorer 416 is configured to combine information from tuples 428 and tuples 430 to generate importance score listing 218. In examples, keyword importance scorer 416 performs a lookup in tuples 428 and/or tuples 430 to find matching keyword values to generate importance score listing 218. In an illustration, keyword importance scorer 416 identifies, for each keyword in tuples 428, a matching entity from tuples 428. Based on such information, information corresponding to the keyword and entity are merged to generate a new tuple that identifies the keyword, a keyword score for the keyword, and the entity associated with the keyword. In some further examples, the type associated with the keyword is also identified (e.g., whether the keyword is a word or number). In an example, the tuples in importance score listing are stored as follows: [(keyword_{i}, ks(i), entity i, type i), (keyword_{i+1}, s(i+1), entity_{i+1}, type_{i+1}), . . . ], where ks represents the keyword score for a given keyword, entity represents the entity for the keyword, and type represents the type for the keyword.

In examples, the foregoing process is performed for each text fragment in training dataset 402, resulting in tuples generated for a plurality of text fragments. In examples, such tuples are combined together to create importance score listing 218 that comprises a data structure representing keywords, entities, importance scores, and optionally types, learned across text fragments of training dataset 402. For instance, importance scores for a given keyword appearing in multiple fragments are combined in various ways, such as by averaging the scores together or via other techniques.

In implementations, as new text fragments are introduced into training dataset 402, a relative importance of each keyword in importance score listing 218 changes or drifts over time in implementations. To account for this, score updater 418 is configured provide a signal 434 to cause keyword importance scorer 416 to generated an updated version of importance score listing 218 in examples. For instance, when one or more additional text fragments are added to training dataset 402, keyword importance scorer 416 causes entity recognizer 406 and keyword extractor 408 to perform a similar process as described above, resulting in an updated importance score listing. Such a process is performed in real-time (e.g., when a new fragment is added to the dataset), periodically, based on an event, and/or in response to a user input in examples. In this manner, importance score listing 218 comprises an up to date representation of keyword importance scores for keywords in training dataset 402 using a periodic or online refresh in examples.

Figure 5:
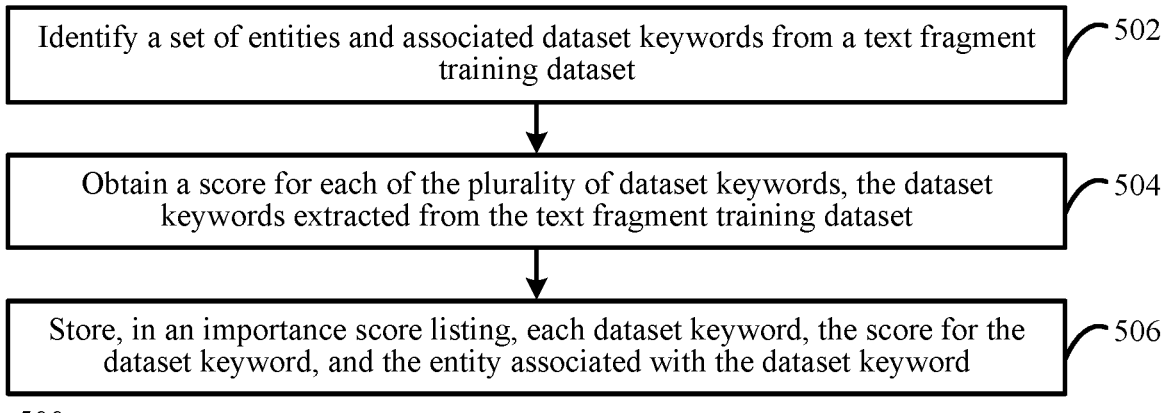
FIG. 5 shows a flowchart of a method for storing importance scores in an importance score listing, in accordance with an example embodiment.

As described above, keyword importance scorer 416 is configured to generate importance scores for keywords in a dataset of documents in various ways. For example, FIG. 5 shows a flowchart 500 for storing importance scores in an importance score listing, in accordance with an example embodiment. In an embodiment, flowchart 500 is implemented by system 400 as shown in FIG. 4. Accordingly, flowchart 500 will be described with reference to FIG. 4. Other structural and operational embodiments will be apparent to persons skilled in the relevant art(s) based on the following discussion regarding flowchart 500 and system 400 of FIG. 4.

Flowchart 500 begins with step 502. In step 502, a set of entities and associated dataset keywords is identified from a text fragment training dataset. For instance, with reference to FIG. 4, entity recognizer 406 is configured to identify a set of entities e by applying NER model 410 to text fragments of training dataset 402. In embodiments, entity recognizer 406 is also configured to identify, for each entity, an associated dataset keyword k that belongs to the entity. As noted elsewhere, entity recognizer 406 therefore generates a set of tuples containing the information [e1, [k11, k12, . . . ]; e2, [k21, k22, . . . ]], where [k11, k12, . . . ] comprises a list of dataset keywords (i.e., keyword values) associated with an entity e1, [k21, k22, . . . ] comprises a list of dataset keywords associated with an entity e2, and so on.

In step 504, a score is obtained for each of the plurality of dataset keywords, where the dataset keywords are extracted from the text fragment training dataset. For instance, with continued reference to FIG. 4, keyword extractor 408 is configured to obtain (e.g., generate) an importance score for each of a plurality of dataset keywords extracted from a text fragment of training dataset 402 by applying keyword extraction model 412. In examples, the importance score comprises a measure of importance of a given keyword relative to one or more other keywords (e.g., in a given text fragment). As noted elsewhere, keyword extractor 408 is configured to output a set of tuples 430 containing the information [(k1, s1), (k2, s2), . . . ] in an illustrative embodiment, where k represents the dataset keyword, and s represents an importance score generated for the dataset keyword.

In step 506, each dataset keyword, the score for the dataset keyword, and the entity associated with the dataset keyword are stored in an importance score listing. For instance, with continued reference to FIG. 4, keyword importance scorer 416 is configured to combine information from tuples 428 and 430, and store such combined information in importance score listing 218. In an embodiment, the combined information stored in importance score listing 218 comprises, for each dataset keyword, an identification of the keyword, the score for the dataset keyword, and the entity associated with the dataset keyword.

In examples, keyword importance scorer 416 contains information combined from a plurality of text fragments (e.g., all text fragments of training dataset 402), thereby resulting in the generation of an importance score listing 218 that represents, among other things, a listing that identifies importance scores for keywords across an entire training dataset. As noted earlier, such importance information is used in accordance with an embodiment to compress a prompt, such as by keeping strings of a populated abstract prompt template that have an importance that satisfies a budgeting criteria.

As described above, a data-driven abstract prompt template is utilized in accordance with example implementations. For example, FIG. 6 shows a flowchart 600 for generating an abstract prompt template that is to be populated with keywords, in accordance with an example embodiment. In an embodiment, flowchart 600 is implemented by system 200 as shown in FIG. 2 and system 400 as shown in FIG. 4. Accordingly, flowchart 600 will be described with reference to FIGS. 2 and 4. Other structural and operational embodiments will be apparent to persons skilled in the relevant art(s) based on the following discussion regarding flowchart 600, system 200 of FIG. 2, and system 400 of FIG. 4.

Flowchart 600 begins with step 602. In step 602, a set of entities is identified from a text fragment training dataset. For instance, with reference to FIGS. 2 and 4, abstract prompt template generator 206 identifies a set of entities 226 that are present in a text fragment training dataset, such as training dataset 402. In some examples, set of entities is identified by entity recognizer 406 by applying NER model 410 to the text fragments of training dataset 402, to identify a complete set of entities across the training dataset (i.e., all unique entities across the training dataset).

In step 604, an abstract prompt template is generated that includes a plurality of strings, each string comprising one of the entities of the set of entities and a placeholder for an entity value corresponding to the entity. For instance, abstract prompt template generator 206 is configured to generate abstract prompt template 224 that includes a plurality of strings (e.g., arranged as rows in a table, sentences in a document, etc.). In examples, each string comprises a particular one of the entities in the set of entities 226 and a placeholder for an entity value corresponding to the entity.

In an illustration, abstract prompt template 224 comprises a prompt composed of N sentences where N is the number of unique entities in importance score listing 218. For instance, abstract prompt template 224 is arranged as follows in an implementation: "[Entity ei] has the value [placeholder value]. [Entity e_{i+1}] has the value [placeholder value] . . . ," where Entity ei, e_{i+1}, and so on, are populated in the template with the names of the entities in the set of entities 226, while their corresponding placeholder values represent placeholder for concrete values that remain unpopulated at this stage, but will be selectively populated during runtime. Other types of strings in the prompt template and/or any other prompt template arrangement is possible in accordance with embodiments. It should be noted, however, that in various embodiments, each string identifies a relationship between an entity and an entity value (to be selectively populated later), and that each string can be ranked relative to other strings based on their relative importance scores.

In an implementation, the placeholder for the entity value is selectively populated (or not populated) depending on whether entity is present in a current text fragment that is to be compressed. In implementations, abstract prompt template 224 therefore includes a sequence of strings driven by the data contained in training dataset 402, where the abstract prompt template is used for compressing a particular text fragment.

As described above, a prompt abstract template is generated that is populated based on information in a current text fragment to be compressed in example implementations. For example, FIG. 7 shows a flowchart 700 for populating a placeholder of an abstract prompt template, in accordance with an example embodiment. In an embodiment, flowchart 700 is implemented by system 200 as shown in FIG. 2 and system 400 as shown in FIG. 4. Accordingly, flowchart 700 will be described with reference to FIGS. 2 and 4. Other structural and operational embodiments will be apparent to persons skilled in the relevant art(s) based on the following discussion regarding flowchart 700, system 200 of FIG. 2, and system 400 of FIG. 4.

Flowchart 700 begins with step 702. In step 702, for each of a plurality of keywords in a current text fragment, a corresponding keyword entity is identified. For instance, with reference to FIGS. 2 and 4, fragment keyword scorer 202 is configured to identify, for each of a plurality of keywords in current text fragment 216, a corresponding keyword entity. In examples, fragment keyword scorer 202 is configured to extract keywords from current text fragment 216 in various ways, including but not limited to applying a keyword extraction model or using other techniques. In accordance with an embodiment, fragment keyword scorer 202 identifies a keyword entity corresponding to each of the plurality of keywords of the current text fragment based on accessing importance score listing 218 and performing a lookup therein. For example, fragment keyword scorer 202 determines if a given keyword of the current text fragment is present in importance score listing 218, and if so, obtains the entity corresponding to the keyword. In a further implementation, fragment keyword scorer 202 also obtains the importance score and/or the type corresponding to the keyword.

In step 704, for each keyword entity, a placeholder of a string containing the keyword entity in the abstract prompt template is populated with the keyword corresponding to the keyword entity. For instance, with reference to FIG. 2, prompt runtime filler 204 is configured to populate abstract prompt template 224 based on information contained in the current text fragment. In an example, prompt runtime filler 204 populates the abstract prompt template by selectively populating placeholders in each string in the template that contains a keyword entity that is also present in the current text fragment. For instance, prompt runtime filler 204 populates, for each keyword entity in the current text fragment, a placeholder of a string containing the same keyword entity, where the populated information comprises the keyword of the current text fragment that corresponds to the keyword entity. Illustrative examples of populating the abstract prompt template in such a manner are described elsewhere herein.

Accordingly, prompt runtime filler 204 is configured to transform a current text fragment into a structured form in various examples. In accordance with an embodiment, prompt runtime filler 204 is also configured to rank the strings of abstract prompt template based on the importance scores for each keyword. For instance, the highest importance keywords are identified at the beginning, while the lowest importance keywords are identified at the end. In this manner, the abstract prompt template is transformed into a ranked structure that identifies entities and their associated keywords in an order of relative importance. This ranked and populated abstract prompt template is then utilized by prompt compressor 208 to compress the information contained therein in accordance with disclosed examples, as described elsewhere herein.

As described above, a populated prompt abstract template is compressed to generate a compressed text fragment in various ways. For example, FIG. 8 shows a flowchart 800 for removing information in a populated abstract prompt template, in accordance with an example embodiment. In an embodiment, flowchart 800 is implemented by system 200 as shown in FIG. 2. Accordingly, flowchart 800 will be described with reference to FIG. 2. Other structural and operational embodiments will be apparent to persons skilled in the relevant art(s) based on the following discussion regarding flowchart 800 and system 200 of FIG. 2.

Flowchart 800 begins with step 802. In step 802, information from a populated abstract prompt template that does not satisfy a budgeting criteria is removed. For instance, with reference to FIG. 2, prompt compressor 208 is configured to remove information from populated abstract prompt template 222 that does not satisfy budgeting criteria 232. In examples, the removal of information comprises discarding strings in the populated abstract prompt template that do not satisfy the budgeting criteria.

As discussed elsewhere, the budgeting criteria (which can be input via a user input, determined automatically, or determined in various other ways) defines the manner by which strings are selectively kept and/or discarded from the populated abstract prompt template, such as based on their relative importance. In this manner, when the budgeting criteria is applied, one or more strings of the populated abstract prompt template are removed (e.g., such as strings that have a relatively low importance compared to other strings), thereby resulting in a compressed text fragment that is included in budget controlled prompt 210.

In example embodiments, a keyword in a compressed text fragment is transformed into a different keyword. For example, FIG. 9 shows a flowchart 900 for transforming a keyword contained in a current text fragment to a different keyword based on a type associated with the keyword, in accordance with an example embodiment. In an embodiment, flowchart 900 is implemented by system 200 as shown in FIG. 2. Accordingly, flowchart 900 will be described with reference to FIG. 2. Other structural and operational embodiments will be apparent to persons skilled in the relevant art(s) based on the following discussion regarding flowchart 900 and system 200 of FIG. 2.

Flowchart 900 begins with step 902. In step 902, a type is assigned to a first keyword of the plurality of keywords. For instance, with reference to FIG. 2, fragment keyword scorer 202 is configured to extract keywords from current text fragment 216 and assign a type to a first keyword in the current text fragment. In an embodiment, fragment keyword scorer 202 is configured to assign the type to a given keyword based on information contained in importance score listing 218. For instance, in some examples as described elsewhere, importance score listing 218 contains information related to a type (e.g., categorical and/or numerical) for each keyword in the listing. In such implementations, fragment keyword scorer 202 obtains the type as indicated in the importance score listing for the keyword.

In step 904, the first keyword is transformed into a second keyword in the compressed text fragment based on the type. For instance, with reference to FIG. 2, prompt compressor 208 is configured to transform the first keyword into a second keyword in the compressed text fragment based on the type. In one implementation, the second keyword comprises a type that is different from the type.

As an illustration, if a type assigned to a first keyword is numerical (e.g., the keyword contains numbers), fragment keyword scorer is configured to transform the numerical keyword into a categorical keyword, such as a keyword that removes the numbers and contains letters (or other characters). As an illustration, if a given keyword is "5 stars" and is assigned a numerical type, fragment keyword scorer 202 is configured to transform the keyword into a different keyword of the categorical type, such as "high" or "best," in examples. This is only illustrative, and other transformations are contemplated. It should be noted that the transformation can occur at any other stage of the process, including after the abstract prompt template is populated, and/or after the budgeting criteria is applied to a populated abstract prompt template.

Such transformation of a keyword from one type to another category allows for subsequent processing to be performed differently. For example, in a case of numerical features (e.g., keywords that contain numbers), processing efficiencies can be achieved by bucketing the numerical values into different textual categories, as textual representations of data are typically more appropriate for LLM prompts that receive such information for processing. Thus, such transformations can improve the overall performance of the LLMs that receive this information.

III. Example Mobile Device and Computer System Implementation

Computing device 102, application 104, question-answering server 106, prompt compression system 108, AI model server 110, LLM 112, RAG server 114, augmentation system 116, fragment keyword scorer 202, prompt runtime filler 204, abstract prompt template generator 206, prompt compressor 208, budget controlled prompt 210, budget controller 212, entity recognizer 406, keyword extractor 408, NER model 410, keyword extraction model 412, keyword importance scorer 416, and/or score updater 418 are implemented in hardware, or hardware combined with one or both of software and/or firmware. For example, application 104, prompt compression system 108, LLM 112, augmentation system 116, fragment keyword scorer 202, prompt runtime filler 204, abstract prompt template generator 206, prompt compressor 208, budget controlled prompt 210, budget controller 212, entity recognizer 406, keyword extractor 408, NER model 410, keyword extraction model 412, keyword importance scorer 416, score updater 418, and/or the components described therein, and/or the steps of flowcharts 300, 500, 600, 700, 800, and 900 are each implemented as computer program code/instructions configured to be executed in one or more processors and stored in a computer readable storage medium. Alternatively, application 104, prompt compression system 108, LLM 112, augmentation system 116, fragment keyword scorer 202, prompt runtime filler 204, abstract prompt template generator 206, prompt compressor 208, budget controlled prompt 210, budget controller 212, entity recognizer 406, keyword extractor 408, NER model 410, keyword extraction model 412, keyword importance scorer 416, score updater 418, and/or the components described therein, and/or the steps of flowcharts 300, 500, 600, 700, 800, and 900 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 10:
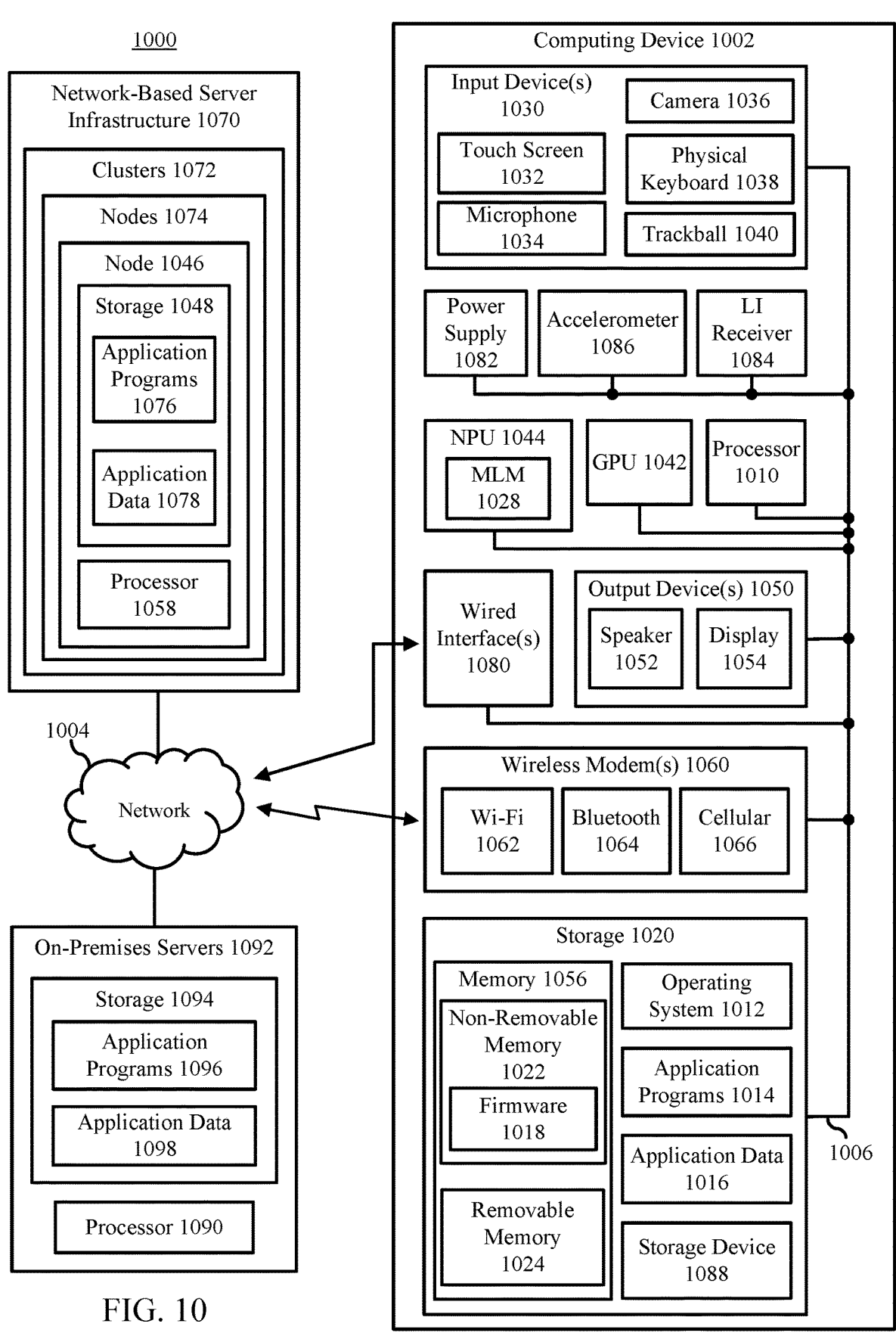
FIG. 10 shows a block diagram of an example computer system in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 10. FIG. 10 shows a block diagram of an exemplary computing environment 1000 that includes a computing device 1002. Computing device 1002 is an example of computing device 102, question-answering server 106, AI model server 110, and RAG server 114, which each include one or more of the components of computing device 1002. In some embodiments, computing device 1002 is communicatively coupled with devices (not shown in FIG. 10) external to computing environment 1000 via network 1004. Network 1004 comprises one or more networks such as local area networks (LANs), wide area networks (WANs), enterprise networks, the Internet, etc. In examples, network 1004 includes one or more wired and/or wireless portions. In some examples, network 1004 additionally or alternatively includes a cellular network for cellular communications. Computing device 1002 is described in detail as follows.

Computing device 1002 can be any of a variety of types of computing devices. Examples of computing device 1002 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 1002 is a stationary computing device such as a desktop computer, a personal computer (PC), a stationary server device, a minicomputer, a mainframe, a supercomputer, etc.

As shown in FIG. 10, computing device 1002 includes a variety of hardware and software components, including a processor 1010, a storage 1020, a graphics processing unit (GPU) 1042, a neural processing unit (NPU) 1044, one or more input devices 1030, one or more output devices 1050, one or more wireless modems 1060, one or more wired interfaces 1080, a power supply 1082, a location information (LI) receiver 1084, and an accelerometer 1086. Storage 1020 includes memory 1056, which includes non-removable memory 1022 and removable memory 1024, and a storage device 1088. Storage 1020 also stores an operating system 1012, application programs 1014, and application data 1016. Wireless modem(s) 1060 include a Wi-Fi modem 1062, a Bluetooth modem 1064, and a cellular modem 1066. Output device(s) 1050 includes a speaker 1052 and a display 1054. Input device(s) 1030 includes a touch screen 1032, a microphone 1034, a camera 1036, a physical keyboard 1038, and a trackball 1040. Not all components of computing device 1002 shown in FIG. 10 are present in all embodiments, additional components not shown may be present, and in a particular embodiment any combination of the components are present. In examples, components of computing device 1002 are mounted to a circuit card (e.g., a motherboard) of computing device 1002, integrated in a housing of computing device 1002, or otherwise included in computing device 1002. The components of computing device 1002 are described as follows.

In embodiments, a single processor 1010 (e.g., central processing unit (CPU), microcontroller, a microprocessor, signal processor, ASIC (application specific integrated circuit), and/or other physical hardware processor circuit) or multiple processors 1010 are present in computing device 1002 for performing such tasks as program execution, signal coding, data processing, input/output processing, power control, and/or other functions. In examples, processor 1010 is a single-core or multi-core processor, and each processor core is single-threaded or multithreaded (to provide multiple threads of execution concurrently). Processor 1010 is configured to execute program code stored in a computer readable medium, such as program code of operating system 1012 and application programs 1014 stored in storage 1020.

The program code is structured to cause processor 1010 to perform operations, including the processes/methods disclosed herein. Operating system 1012 controls the allocation and usage of the components of computing device 1002 and provides support for one or more application programs 1014 (also referred to as "applications" or "apps"). In examples, application programs 1014 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 1010 includes one or more general processors (e.g., CPUs) configured with or coupled to one or more hardware accelerators, such as one or more NPUs 1044 and/or one or more GPUs 1042.

Any component in computing device 1002 can communicate with any other component according to function, although not all connections are shown for ease of illustration. For instance, as shown in FIG. 10, bus 1006 is a multiple signal line communication medium (e.g., conductive traces in silicon, metal traces along a motherboard, wires, etc.) present to communicatively couple processor 1010 to various other components of computing device 1002, although in other embodiments, an alternative bus, further buses, and/or one or more individual signal lines is/are present to communicatively couple components. Bus 1006 represents one or more of any of several types of bus structures, including a memory bus or memory controller, a peripheral bus, an accelerated graphics port, and a processor or local bus using any of a variety of bus architectures.

Storage 1020 is physical storage that includes one or both of memory 1056 and storage device 1088, which store operating system 1012, application programs 1014, and application data 1016 according to any distribution. Non-removable memory 1022 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 1022 includes main memory and is separate from or fabricated in a same integrated circuit as processor 1010. As shown in FIG. 10, non-removable memory 1022 stores firmware 1018 that is present to provide low-level control of hardware. Examples of firmware 1018 include BIOS (Basic Input/Output System, such as on personal computers) and boot firmware (e.g., on smart phones). In examples, removable memory 1024 is inserted into a receptacle of or is otherwise coupled to computing device 1002 and can be removed by a user from computing device 1002. Removable memory 1024 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 1088 are present that are internal and/or external to a housing of computing device 1002 and are or are not removable. Examples of storage device 1088 include a hard disk drive, a SSD, a thumb drive (e.g., a USB (Universal Serial Bus) flash drive), or other physical storage device.

One or more programs are stored in storage 1020. Such programs include operating system 1012, one or more application programs 1014, and other program modules and program data. Examples of such application programs include computer program logic (e.g., computer program code/instructions) for implementing application 104, prompt compression system 108, LLM 112, augmentation system 116, fragment keyword scorer 202, prompt runtime filler 204, abstract prompt template generator 206, prompt compressor 208, budget controlled prompt 210, budget controller 212, entity recognizer 406, keyword extractor 408, NER model 410, keyword extraction model 412, keyword importance scorer 416, score updater 418, and/or the components described therein, and/or the steps of flowcharts 300, 500, 600, 700, 800, and 900, and/or any individual steps thereof.

Storage 1020 also stores data used and/or generated by operating system 1012 and application programs 1014 as application data 1016. Examples of application data 1016 include web pages, text, images, tables, sound files, video data, and other data. In examples, application data 1016 is sent to and/or received from one or more network servers or other devices via one or more wired or wireless networks. Storage 1020 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 1002 through one or more input devices 1030 and receives information from computing device 1002 through one or more output devices 1050. Input device(s) 1030 includes one or more of touch screen 1032, microphone 1034, camera 1036, physical keyboard 1038 and/or trackball 1040 and output device(s) 1050 includes one or more of speaker 1052 and display 1054. Each of input device(s) 1030 and output device(s) 1050 are integral to computing device 1002 (e.g., built into a housing of computing device 1002) or are external to computing device 1002 (e.g., communicatively coupled wired or wirelessly to computing device 1002 via wired interface(s) 1080 and/or wireless modem(s) 1060). Further input devices 1030 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1054 displays information, as well as operating as touch screen 1032 by receiving user commands and/or other information (e.g., by touch, finger gestures, virtual keyboard, etc.) as a user interface. Any number of each type of input device(s) 1030 and output device(s) 1050 are present, including multiple microphones 1034, multiple cameras 1036, multiple speakers 1052, and/or multiple displays 1054.

In embodiments where GPU 1042 is present, GPU 1042 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 1042 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 1044 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 1028. In an example, NPU 1044 is configured for a data-driven parallel computing and is highly efficient at processing massive multimedia data such as videos and images and processing data for neural networks. NPU 1044 is configured for efficient handling of AI-related tasks, such as speech recognition, background blurring in video calls, photo or video editing processes like object detection, etc.

In embodiments disclosed herein that implement ML models, NPU 1044 can be utilized to execute such ML models, of which MLM 1028 is an example. For instance, where applicable, MLM 1028 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 1044 is used to train MLM 1028. To train MLM 1028, training data is that includes input features (attributes) and their corresponding output labels/target values (e.g., for supervised learning) is collected. A training algorithm is a computational procedure that is used so that MLM 1028 learns from the training data. Parameters/weights are internal settings of MLM 1028 that are adjusted during training by the training algorithm to reduce a difference between predictions by MLM 1028 and actual outcomes (e.g., output labels). In some examples, MLM 1028 is set with initial values for the parameters/weights. A loss function measures a dissimilarity between predictions by MLM 1028 and the target values, and the parameters/weights of MLM 1028 are adjusted to minimize the loss function. The parameters/weights are iteratively adjusted by an optimization technique, such as gradient descent. In this manner, MLM 1028 is generated through training by NPU 1044 to be used to generate inferences based on received input feature sets for particular applications. MLM 1028 is generated as a computer program or other type of algorithm configured to generate an output (e.g., a classification, a prediction/inference) based on received input features, and is stored in the form of a file or other data structure.

In examples, such training of MLM 1028 by NPU 1044 is supervised or unsupervised. According to supervised learning, input objects (e.g., a vector of predictor variables) and a desired output value (e.g., a human-labeled supervisory signal) train MLM 1028. The training data is processed, building a function that maps new data on expected output values. Example algorithms usable by NPU 1044 to perform supervised training of MLM 1028 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 1028 is an LLM, MLM 1028 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM.

According to unsupervised learning, MLM 1028 is trained to learn patterns from unlabeled data. For instance, in embodiments where MLM 1028 implements unsupervised learning techniques, MLM 1028 identifies one or more classifications or clusters to which an input belongs. During a training phase of MLM 1028 according to unsupervised learning, MLM 1028 tries to mimic the provided training data and uses the error in its mimicked output to correct itself (i.e., correct weights and biases). In further examples, NPU 1044 perform unsupervised training of MLM 1028 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 1044 need not necessarily be present in all ML model embodiments. In embodiments where ML models are present, any one or more of processor 1010, GPU 1042, and/or NPU 1044 can be present to train and/or execute MLM 1028.

One or more wireless modems 1060 can be coupled to antenna(s) (not shown) of computing device 1002 and can support two-way communications between processor 1010 and devices external to computing device 1002 through network 1004, as would be understood to persons skilled in the relevant art(s). Wireless modem 1060 is shown generically and can include a cellular modem 1066 for communicating with one or more cellular networks, such as a GSM network for data and voice communications within a single cellular network, between cellular networks, or between the mobile device and a public switched telephone network (PSTN). In examples, wireless modem 1060 also or alternatively includes other radio-based modem types, such as a Bluetooth modem 1064 (also referred to as a "Bluetooth device") and/or Wi-Fi modem 1062 (also referred to as an "wireless adaptor"). Wi-Fi modem 1062 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1064 is configured to communicate with another Bluetooth-capable device according to the Bluetooth short-range wireless technology standard(s) such as IEEE 802.15.1 and/or managed by the Bluetooth Special Interest Group (SIG).

Computing device 1002 can further include power supply 1082, LI receiver 1084, accelerometer 1086, and/or one or more wired interfaces 1080. Example wired interfaces 1080 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 1080 of computing device 1002 provide for wired connections between computing device 1002 and network 1004, or between computing device 1002 and one or more devices/peripherals when such devices/peripherals are external to computing device 1002 (e.g., a pointing device, display 1054, speaker 1052, camera 1036, physical keyboard 1038, etc.). Power supply 1082 is configured to supply power to each of the components of computing device 1002 and receives power from a battery internal to computing device 1002, and/or from a power cord plugged into a power port of computing device 1002 (e.g., a USB port, an A/C power port). LI receiver 1084 is useable for location determination of computing device 1002 and in examples includes a satellite navigation receiver such as a Global Positioning System (GPS) receiver and/or includes other type of location determiner configured to determine location of computing device 1002 based on received information (e.g., using cell tower triangulation, etc.). Accelerometer 1086, when present, is configured to determine an orientation of computing device 1002.

Note that the illustrated components of computing device 1002 are not required or all-inclusive, and fewer or greater numbers of components can be present as would be recognized by one skilled in the art. In examples, computing device 1002 includes one or more of a gyroscope, barometer, proximity sensor, ambient light sensor, digital compass, etc. In an example, processor 1010 and memory 1056 are co-located in a same semiconductor device package, such as being included together in an integrated circuit chip, FPGA, or system-on-chip (SOC), optionally along with further components of computing device 1002.

In embodiments, computing device 1002 is configured to implement any of the above-described features of flowcharts herein. Computer program logic for performing any of the operations, steps, and/or functions described herein is stored in storage 1020 and executed by processor 1010.

In some embodiments, server infrastructure 1070 is present in computing environment 1000 and is communicatively coupled with computing device 1002 via network 1004.

Server infrastructure 1070, when present, is a network-accessible server set (e.g., a cloud-based environment or platform). As shown in FIG. 10, server infrastructure 1070 includes clusters 1072. Each of clusters 1072 comprises a group of one or more compute nodes and/or a group of one or more storage nodes. For example, as shown in FIG. 10, cluster 1072 includes nodes 1074. Each of nodes 1074 are accessible via network 1004 (e.g., in a "cloud-based" embodiment) to build, deploy, and manage applications and services. In examples, any of nodes 1074 is a storage node that comprises a plurality of physical storage disks, SSDs, and/or other physical storage devices that are accessible via network 1004 and are configured to store data associated with the applications and services managed by nodes 1074.

Each of nodes 1074, as a compute node, comprises one or more server computers, server systems, and/or computing devices. For instance, a node 1074 in accordance with an embodiment includes one or more of the components of computing device 1002 disclosed herein. Each of nodes 1074 is configured to execute one or more software appli-cations (or "applications") and/or services and/or manage hardware resources (e.g., processors, memory, etc.), which are utilized by users (e.g., customers) of the network-accessible server set. In examples, as shown in FIG. 10, nodes 1074 includes a node 1046 that includes storage 1048 and/or one or more of a processor 1058 (e.g., similar to processor 1010, GPU 1042, and/or NPU 1044 of computing device 1002). Storage 1048 stores application programs 1076 and application data 1078. Processor(s) 1058 operate application programs 1076 which access and/or generate related application data 1078. In an implementation, nodes such as node 1046 of nodes 1074 operate or comprise one or more virtual machines, with each virtual machine emulating a system architecture (e.g., an operating system), in an isolated manner, upon which applications such as applica-tion programs 1076 are executed.

In embodiments, one or more of clusters 1072 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 1072 are included in a datacenter in a distributed collection of datacenters. In embodiments, exemplary computing envi-ronment 1000 comprises part of a cloud-based platform.

In an embodiment, computing device 1002 accesses application programs 1076 for execution in any manner, such as by a client application and/or a browser at computing device 1002.

In an example, for purposes of network (e.g., cloud) backup and data security, computing device 1002 addition-ally and/or alternatively synchronizes copies of application programs 1014 and/or application data 1016 to be stored at network-based server infrastructure 1070 as application pro-grams 1076 and/or application data 1078. In examples, operating system 1012 and/or application programs 1014 include a file hosting service client configured to synchro-nize applications and/or data stored in storage 1020 at network-based server infrastructure 1070.

In some embodiments, on-premises servers 1092 are present in computing environment 1000 and are communi-catively coupled with computing device 1002 via network 1004. On-premises servers 1092, when present, are hosted within an organization's infrastructure and, in many cases, physically onsite of a facility of that organization. On-premises servers 1092 are controlled, administered, and maintained by IT (Information Technology) personnel of the organization or an IT partner to the organization. Applica-tion data 1098 can be shared by on-premises servers 1092 between computing devices of the organization, including computing device 1002 (when part of an organization) through a local network of the organization, and/or through further networks accessible to the organization (including the Internet). Furthermore, in examples, on-premises servers 1092 serve applications such as application programs 1096 to the computing devices of the organization, including computing device 1002. Accordingly, in examples, on-prem-ises servers 1092 include storage 1094 (which includes one or more physical storage devices such as storage disks and/or SSDs) for storage of application programs 1096 and application data 1098 and include a processor 1090 (e.g., similar to processor 1010, GPU 1042, and/or NPU 1044 of computing device 1002) for execution of application pro-grams 1096. In some embodiments, multiple processors 1090 are present for execution of application programs 1096 and/or for other purposes. In further examples, computing device 1002 is configured to synchronize copies of applica-tion programs 1014 and/or application data 1016 for backup storage at on-premises servers 1092 as application programs 1096 and/or application data 1098.

Embodiments described herein may be implemented in one or more of computing device 1002, network-based server infrastructure 1070, and on-premises servers 1092. For example, in some embodiments, computing device 1002 is used to implement systems, clients, or devices, or com-ponents/subcomponents thereof, disclosed elsewhere herein. In other embodiments, a combination of computing device 1002, network-based server infrastructure 1070, and/or on-premises servers 1092 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (micro-electronic machine) memory, nanotechnology-based storage devices, and further types of physical/tangible hardware storage media of storage 1020. Such computer-readable media and/or storage media are distinguished from and non-overlapping with communication media, propagating signals, and signals per se. Stated differently, "computer program medium," "computer-readable medium," "com-puter-readable storage medium," and "computer-readable storage device" do not encompass communication media, propagating signals, and signals per se. Communication media embodies computer-readable instructions, data struc-tures, program modules or other data in a modulated data signal such as a carrier wave. The term "modulated data signal" means a signal that has one or more of its charac-teristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (includ-ing application programs 1014) are stored in storage 1020. Such computer programs can also be received via wired interface(s) 1060 and/or wireless modem(s) 1060 over network 1004. Such computer programs, when executed or loaded by an application, enable computing device 1002 to implement features of embodiments discussed herein. Accordingly, such computer programs represent controllers of the computing device 1002.

Embodiments are also directed to computer program products comprising computer code or instructions stored on any computer-readable medium or computer-readable storage medium. Such computer program products include the physical storage of storage 1020 as well as further physical storage types.

IV. Additional Example Embodiments

A system for compressing a prompt is disclosed herein. The system includes: a processor; and a memory device that stores program code structured to cause the processor to: obtain an importance score listing that includes a score indicative of an importance of a plurality of dataset keywords; identify, from the importance score listing, a keyword importance score for a plurality of keywords in a current text fragment; populate a set of placeholders in an abstract prompt template based on the current text fragment; and compress the populated abstract prompt template based on the keyword importance score for the plurality of keywords in the current text fragment to generate a compressed text fragment, the compressed text fragment included in the prompt for transmission to a computing entity.

In one implementation of the foregoing system, the computing entity comprises a large language model (LLM), and the prompt comprises a query for the LLM to generate an answer thereto.

In another implementation of the foregoing system, the current text fragment is obtained from a retrieval augmentation generation (RAG) system in response to the query transmitted thereto.

In another implementation of the foregoing system, the program code is further structured to cause the processor to: identify a set of entities and associated dataset keywords from a text fragment training dataset; obtain the score for each of the plurality of dataset keywords, the dataset keywords extracted from the text fragment training dataset; and store, in the importance score listing, each dataset keyword, the score for the dataset keyword, and the entity associated with the dataset keyword.

In another implementation of the foregoing system, the program code is further structured to cause the processor to: identify a set of entities from a text fragment training dataset; and generate the abstract prompt template that includes a plurality of strings, each string comprising one of the entities of the set of entities and a placeholder for an entity value corresponding to the entity.

In another implementation of the foregoing system, the program code is structured to cause the processor to populate the set of placeholders in the abstract prompt template by: for each of the plurality of keywords, identifying a corresponding keyword entity; and for each keyword entity, populating a placeholder of a string containing the keyword entity in the abstract prompt template with the keyword corresponding to the keyword entity.

In another implementation of the foregoing system, the program code is structured to cause the processor to compress the populated abstract prompt template by: removing information from the populated abstract prompt template that does not satisfy a budgeting criteria.

In another implementation of the foregoing system, the budgeting criteria comprises a compression ratio.

In another implementation of the foregoing system, the program code is further structured to cause the processor to: assign a type to a first keyword of the plurality of keywords; and transform the first keyword into a second keyword in the compressed text fragment based on the type.

A method for compressing a prompt is disclosed herein. The method includes: obtaining an importance score listing that includes a score indicative of an importance of a plurality of dataset keywords; identifying, from the importance score listing, a keyword importance score for a plurality of keywords in a current text fragment; populating a set of placeholders in an abstract prompt template based on the current text fragment; and compressing the populated abstract prompt template based on the keyword importance score for the plurality of keywords in the current text fragment to generate a compressed text fragment, the compressed text fragment included in the prompt for transmission to a computing entity.

In one implementation of the foregoing method, the computing entity comprises a large language model (LLM), and the prompt comprises a query for the LLM to generate an answer thereto.

In another implementation of the foregoing method, the current text fragment is obtained from a retrieval augmentation generation (RAG) system in response to the query transmitted thereto.

In another implementation of the foregoing method, the method further comprises: identifying a set of entities and associated dataset keywords from a text fragment training dataset; obtaining the score for each of the plurality of dataset keywords, the dataset keywords extracted from the text fragment training dataset; and storing, in the importance score listing, each dataset keyword, the score for the dataset keyword, and the entity associated with the dataset keyword.

In another implementation of the foregoing method, the method further comprises: identifying a set of entities from a text fragment training dataset; and generating the abstract prompt template that includes a plurality of strings, each string comprising one of the entities of the set of entities and a placeholder for an entity value corresponding to the entity.

In another implementation of the foregoing method, the populating the set of placeholders in the abstract prompt template comprises: for each of the plurality of keywords, identifying a corresponding keyword entity; and for each keyword entity, populating a placeholder of a string containing the keyword entity in the abstract prompt template with the keyword corresponding to the keyword entity.

In another implementation of the foregoing method, the compressing the populated abstract prompt template comprises: removing information from the populated abstract prompt template that does not satisfy a budgeting criteria.

A computer-readable storage medium is disclosed herein. The computer-readable storage medium has computer program code recorded thereon that when executed by at least one processor causes the at least one processor to perform a method comprising: obtaining an importance score listing that includes a score indicative of an importance of a plurality of dataset keywords; identifying, from the importance score listing, a keyword importance score for a plurality of keywords in a current text fragment; populating a set of placeholders in an abstract prompt template based on the current text fragment; and compressing the populated abstract prompt template based on the keyword importance score for the plurality of keywords in the current text fragment to generate a compressed text fragment, the compressed text fragment included in the prompt for transmission to a computing entity.

In one implementation of the foregoing computer-readable storage medium, the computing entity comprises a large language model (LLM), and the prompt comprises a query for the LLM to generate an answer thereto.

In another implementation of the foregoing computer-readable storage medium, the current text fragment is obtained from a retrieval augmentation generation (RAG) system in response to the query transmitted thereto.

In another implementation of the foregoing computer-readable storage medium, the method further comprises: identifying a set of entities and associated dataset keywords from a text fragment training dataset; obtaining the score for each of the plurality of dataset keywords, the dataset keywords extracted from the text fragment training dataset; and storing, in the importance score listing, each dataset keyword, the score for the dataset keyword, and the entity associated with the dataset keyword.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the claimed embodiments should not be limited by any of the above-described exemplary embodiments, but should be defined only in accordance with the following claims and their equivalents.

What is claimed is:

1. A system for compressing a prompt, the system comprising:
   a processor; and
   a memory device that stores program code structured to cause the processor to:
   obtain an importance score listing that includes a score indicative of an importance of a plurality of dataset keywords;

identify, from the importance score listing, a keyword importance score for a plurality of keywords in a current text fragment;
   populate a set of placeholders in an abstract prompt template based on the current text fragment; and
   compress the populated abstract prompt template based on the keyword importance score for the plurality of keywords in the current text fragment to generate a compressed text fragment, the compressed text fragment included in the prompt for transmission to a computing entity.

2. The system of claim 1, wherein the computing entity comprises a large language model (LLM), and wherein the prompt comprises a query for the LLM to generate an answer thereto.

3. The system of claim 2, wherein the current text fragment is obtained from a retrieval augmentation generation (RAG) system in response to the query transmitted thereto.

4. The system of claim 1, wherein the program code is further structured to cause the processor to:
   identify a set of entities and associated dataset keywords from a text fragment training dataset;
   obtain the score for each of the plurality of dataset keywords, the dataset keywords extracted from the text fragment training dataset; and
   store, in the importance score listing, each dataset keyword, the score for the dataset keyword, and the entity associated with the dataset keyword.

5. The system of claim 1, wherein the program code is further structured to cause the processor to:
   identify a set of entities from a text fragment training dataset; and
   generate the abstract prompt template that includes a plurality of strings, each string comprising one of the entities of the set of entities and a placeholder for an entity value corresponding to the entity.

6. The system of claim 5, wherein the program code is structured to cause the processor to populate the set of placeholders in the abstract prompt template by:
   for each of the plurality of keywords, identifying a corresponding keyword entity; and
   for each keyword entity, populating a placeholder of a string containing the keyword entity in the abstract prompt template with the keyword corresponding to the keyword entity.

7. The system of claim 1, wherein the program code is structured to cause the processor to compress the populated abstract prompt template by:
   removing information from the populated abstract prompt template that does not satisfy a budgeting criteria.

8. The system of claim 7, wherein the budgeting criteria comprises a compression ratio.

9. The system of claim 1, wherein the program code is further structured to cause the processor to:
   assign a type to a first keyword of the plurality of keywords; and
   transform the first keyword into a second keyword in the compressed text fragment based on the type.

10. A method for compressing a prompt, comprising:
   obtaining an importance score listing that includes a score indicative of an importance of a plurality of dataset keywords;
   identifying, from the importance score listing, a keyword importance score for a plurality of keywords in a current text fragment;

populating a set of placeholders in an abstract prompt template based on the current text fragment; and compressing the populated abstract prompt template based on the keyword importance score for the plurality of keywords in the current text fragment to generate a compressed text fragment, the compressed text fragment included in the prompt for transmission to a computing entity.

11. The method of claim 10, wherein the computing entity comprises a large language model (LLM), and wherein the prompt comprises a query for the LLM to generate an answer thereto.

12. The method of claim 11, wherein the current text fragment is obtained from a retrieval augmentation generation (RAG) system in response to the query transmitted thereto.

13. The method of claim 10, further comprising:

identifying a set of entities and associated dataset keywords from a text fragment training dataset;

obtaining the score for each of the plurality of dataset keywords, the dataset keywords extracted from the text fragment training dataset; and storing, in the importance score listing, each dataset keyword, the score for the dataset keyword, and the entity associated with the dataset keyword.

14. The method of claim 10, further comprising:

identifying a set of entities from a text fragment training dataset; and generating the abstract prompt template that includes a plurality of strings, each string comprising one of the entities of the set of entities and a placeholder for an entity value corresponding to the entity.

15. The method of claim 14, wherein the populating the set of placeholders in the abstract prompt template comprises:

for each of the plurality of keywords, identifying a corresponding keyword entity; and for each keyword entity, populating a placeholder of a string containing the keyword entity in the abstract prompt template with the keyword corresponding to the keyword entity.

16. The method of claim 10, wherein the compressing the populated abstract prompt template comprises:

removing information from the populated abstract prompt template that does not satisfy a budgeting criteria.

17. A computer-readable storage medium having computer program code recorded thereon that when executed by at least one processor causes the at least one processor to perform a method comprising:

obtaining an importance score listing that includes a score indicative of an importance of a plurality of dataset keywords;

identifying, from the importance score listing, a keyword importance score for a plurality of keywords in a current text fragment;

populating a set of placeholders in an abstract prompt template based on the current text fragment; and compressing the populated abstract prompt template based on the keyword importance score for the plurality of keywords in the current text fragment to generate a compressed text fragment, the compressed text fragment included in the prompt for transmission to a computing entity.

18. The computer-readable storage medium of claim 17, wherein the computing entity comprises a large language model (LLM), and wherein the prompt comprises a query for the LLM to generate an answer thereto.

19. The computer-readable storage medium of claim 18, wherein the current text fragment is obtained from a retrieval augmentation generation (RAG) system in response to the query transmitted thereto.

20. The computer-readable storage medium of claim 17, wherein the method further comprises:

identifying a set of entities and associated dataset keywords from a text fragment training dataset;

obtaining the score for each of the plurality of dataset keywords, the dataset keywords extracted from the text fragment training dataset; and storing, in the importance score listing, each dataset keyword, the score for the dataset keyword, and the entity associated with the dataset keyword.

* * * * *